US009205359B2

(12) United States Patent
Kelmartin et al.

(10) Patent No.: US 9,205,359 B2
(45) Date of Patent: Dec. 8, 2015

(54) V-PANEL FILTERS

(71) Applicant: W. L. Gore & Associates, Inc., Newark, DE (US)

(72) Inventors: Thomas P. Kelmartin, West Chester, PA (US); Wai Sing Poon, Hockessin, DE (US); Mark Duane Briggs, Newark, DE (US); Matthew Robert Gessner, Middletown, DE (US); Ryder William Pingry, Newark, DE (US); Shawn Patrick Riley, Wilmington, DE (US); Stephen Robb, Lincoln University, PA (US); Kenneth Stephen Zukor, Havre de Grace, MD (US)

(73) Assignee: W.L. Gore & Associates, Inc., Newark, DE (US)

( * ) Notice: Subject to any disclaimer, the term of this patent is extended or adjusted under 35 U.S.C. 154(b) by 64 days.

(21) Appl. No.: 14/043,991

(22) Filed: Oct. 2, 2013

(65) Prior Publication Data

US 2014/0096493 A1 Apr. 10, 2014

Related U.S. Application Data

(60) Provisional application No. 61/711,525, filed on Oct. 9, 2012.

(51) Int. Cl.
*B01D 46/12* (2006.01)
*B01D 46/00* (2006.01)
(Continued)

(52) U.S. Cl.
CPC .......... *B01D 46/125* (2013.01); *B01D 46/002* (2013.01); *B01D 46/0002* (2013.01); *B01D 46/0005* (2013.01); *B01D 46/0023* (2013.01);
(Continued)

(58) Field of Classification Search
CPC .......... B01D 46/0002; B01D 46/0004; B01D 46/0005; B01D 46/002; B01D 46/125; F02C 7/052
See application file for complete search history.

(56) References Cited

U.S. PATENT DOCUMENTS 5,401,446 A 3/1995 Tsai et al.
5,512,074 A 4/1996 Hanni et al.
(Continued)

FOREIGN PATENT DOCUMENTS

EP 0560012 A1 9/1993

OTHER PUBLICATIONS

International Search Report of PCT/US2013/063180 dated Jan. 9, 2014.

*Primary Examiner* — Robert Clemente
(74) *Attorney, Agent, or Firm* — Amy L. Miller

(57) ABSTRACT

A V-panel filter apparatus and method of construction are provided. The method includes flowing curable potting material into a recess portion of an end cap, positioning first end edge surfaces of first and second filter panels into the contained potting material, and curing the potting material with the first and second filter panels positioned to diverge away from the end cap to define a V-shaped configuration. The method may include flowing curable potting material into a recess portion of a first side plate, positioning edge surfaces of the first and second filter panels into the contained potting material, and curing the potting material. Such steps may be repeated in relation to a second side plate and a header member. By utilizing a pot-and-place sealing methodology, improved seal interfaces are realized. Stability and construction advantages may be provided by snap-fit features of the header member and first and second side plates.

36 Claims, 24 Drawing Sheets

(51) Int. Cl.
*F02C 7/052* (2006.01)
*B29C 39/10* (2006.01)

(52) U.S. Cl.
CPC ................. *F02C 7/052* (2013.01); *B29C 39/10* (2013.01); *Y10T 29/49826* (2015.01)

(56) References Cited

U.S. PATENT DOCUMENTS

| | | | |
|---|---|---|---|
| 5,814,405 A | 9/1998 | Branca et al. | |
| 6,447,566 B1 | 9/2002 | Rivera et al. | |
| 6,955,696 B1 * | 10/2005 | Ost et al. | 55/357 |
| 7,501,003 B2 | 3/2009 | Muller et al. | |
| 7,931,726 B2 | 4/2011 | Karlsson et al. | |
| 7,938,927 B2 | 5/2011 | Sundvik et al. | |
| 7,947,101 B2 | 5/2011 | Devine et al. | |
| 8,147,583 B2 | 4/2012 | Gebert et al. | |
| 8,425,644 B2 | 4/2013 | Sundvik et al. | |
| 8,518,142 B2 | 8/2013 | Handley et al. | |
| 2008/0017038 A1 | 1/2008 | Wu | |
| 2008/0242171 A1 | 10/2008 | Huang et al. | |
| 2009/0193773 A1 * | 8/2009 | Sundvik et al. | 55/478 |
| 2009/0280325 A1 | 11/2009 | Lozano et al. | |
| 2010/0269463 A1 * | 10/2010 | Duffy et al. | 55/483 |
| 2011/0067368 A1 | 3/2011 | Handley et al. | |
| 2011/0252759 A1 * | 10/2011 | Nicholas | 55/497 |
| 2012/0011817 A1 * | 1/2012 | Borkent et al. | 55/419 |
| 2012/0020773 A1 * | 1/2012 | Herrmann | 415/121.2 |
| 2012/0291406 A1 * | 11/2012 | Crabtree et al. | 55/350.1 |
| 2015/0075125 A1 * | 3/2015 | Porbeni et al. | 55/499 |

* cited by examiner

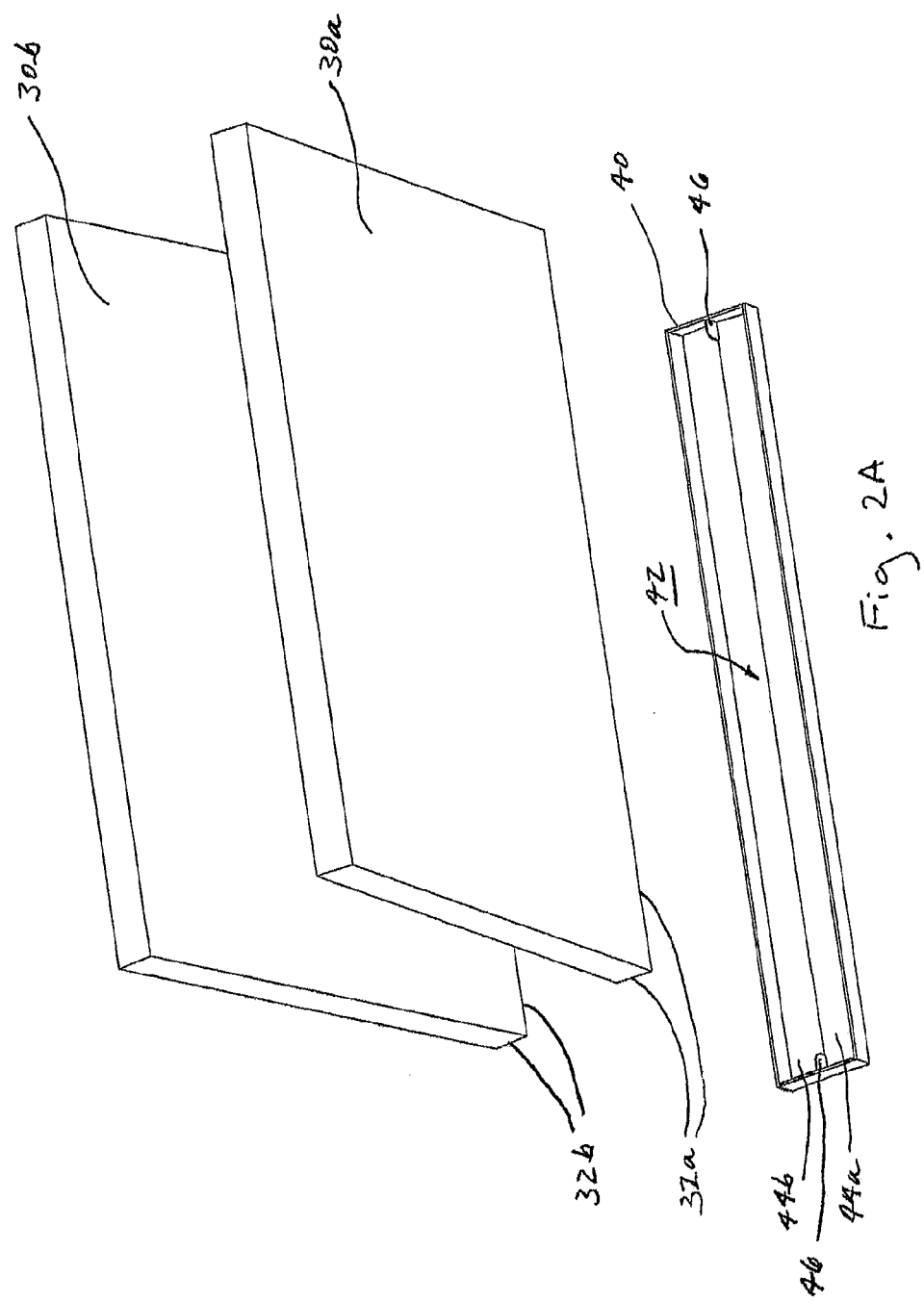

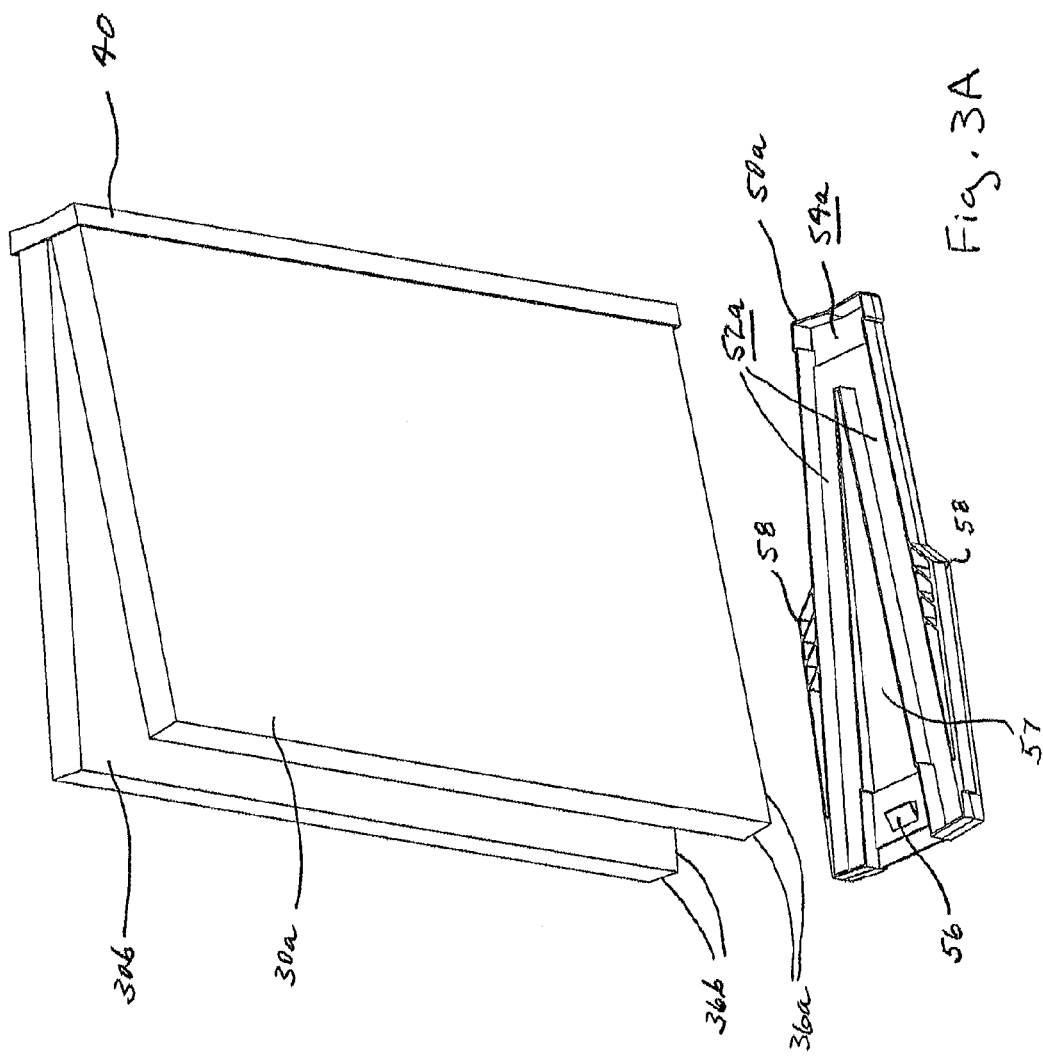

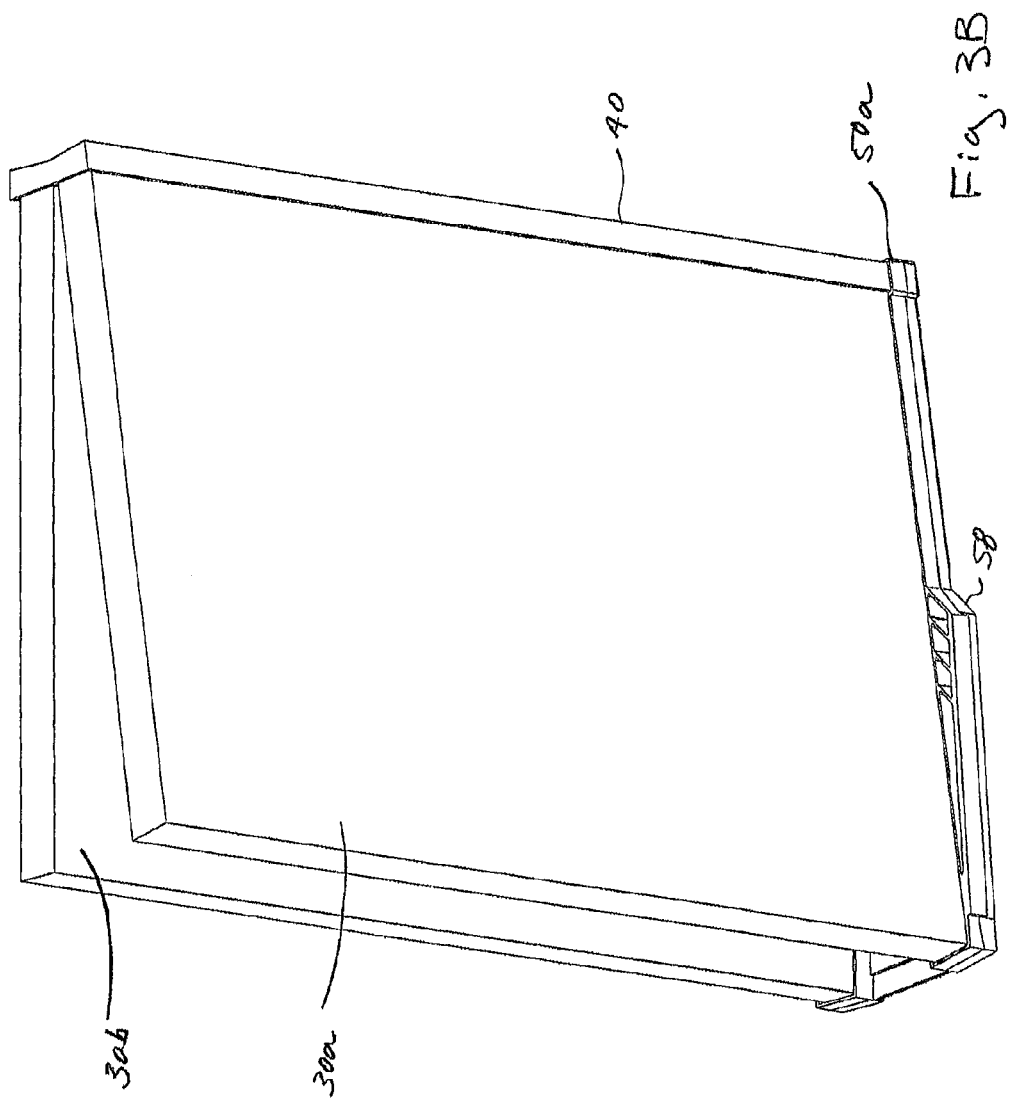

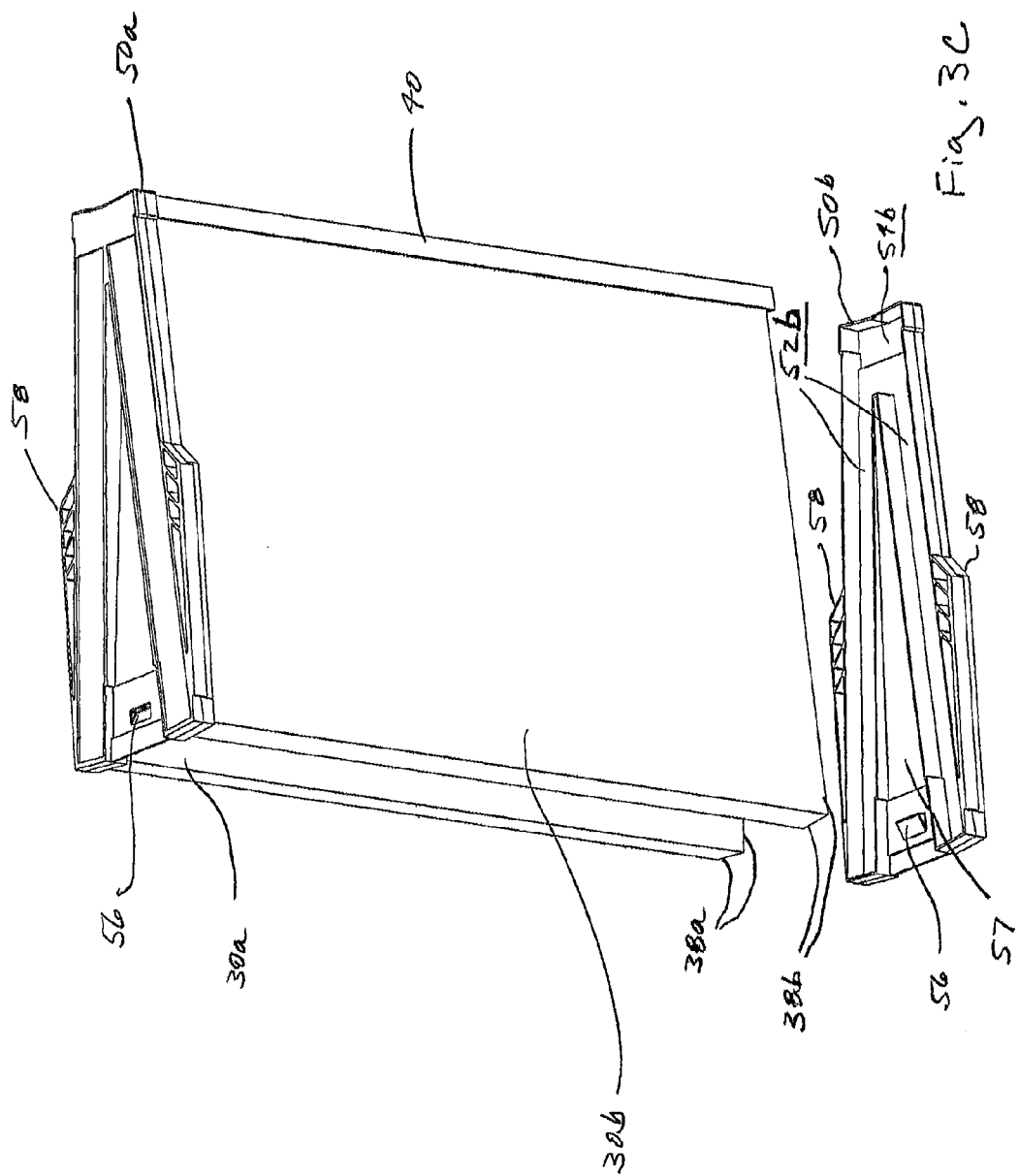

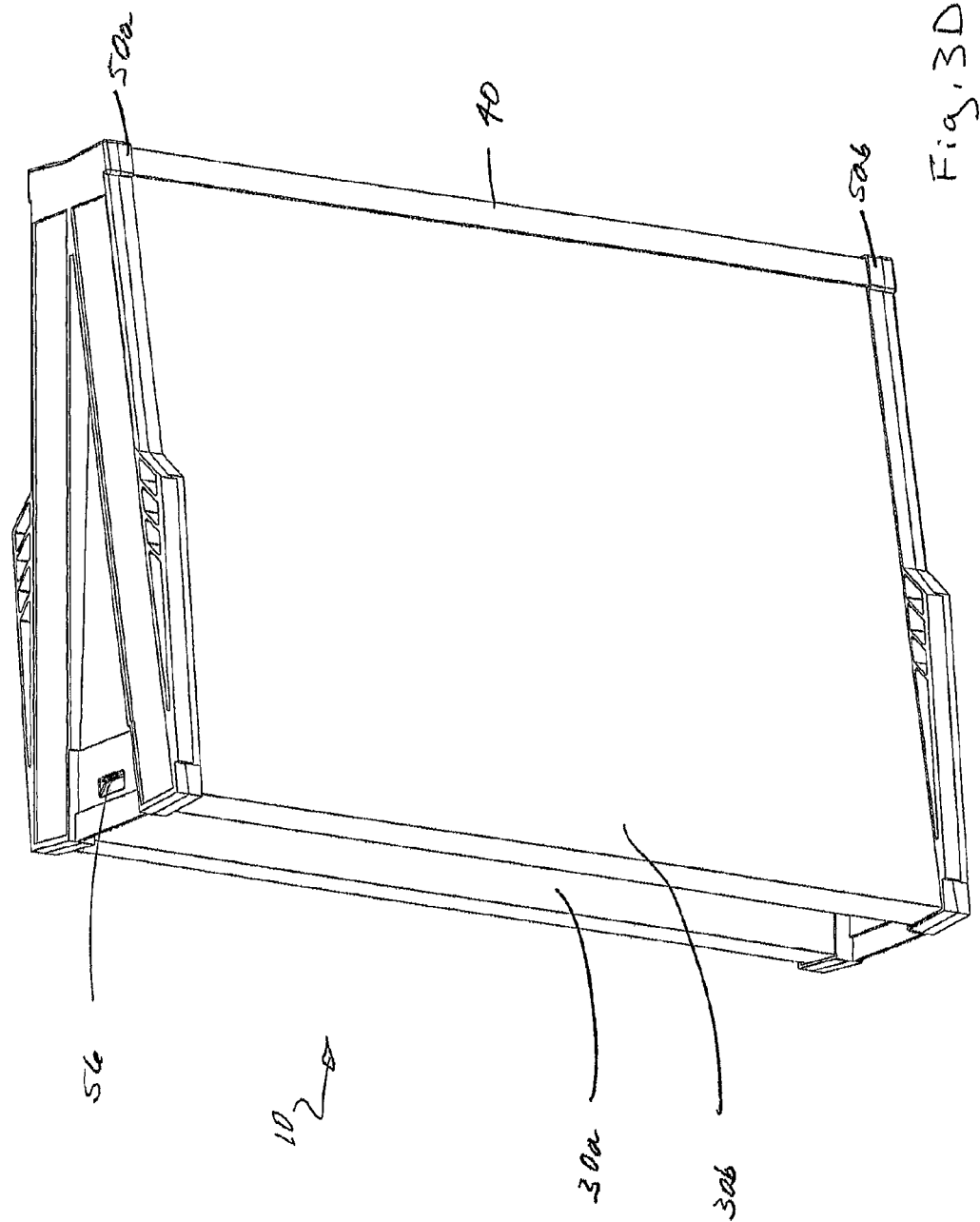

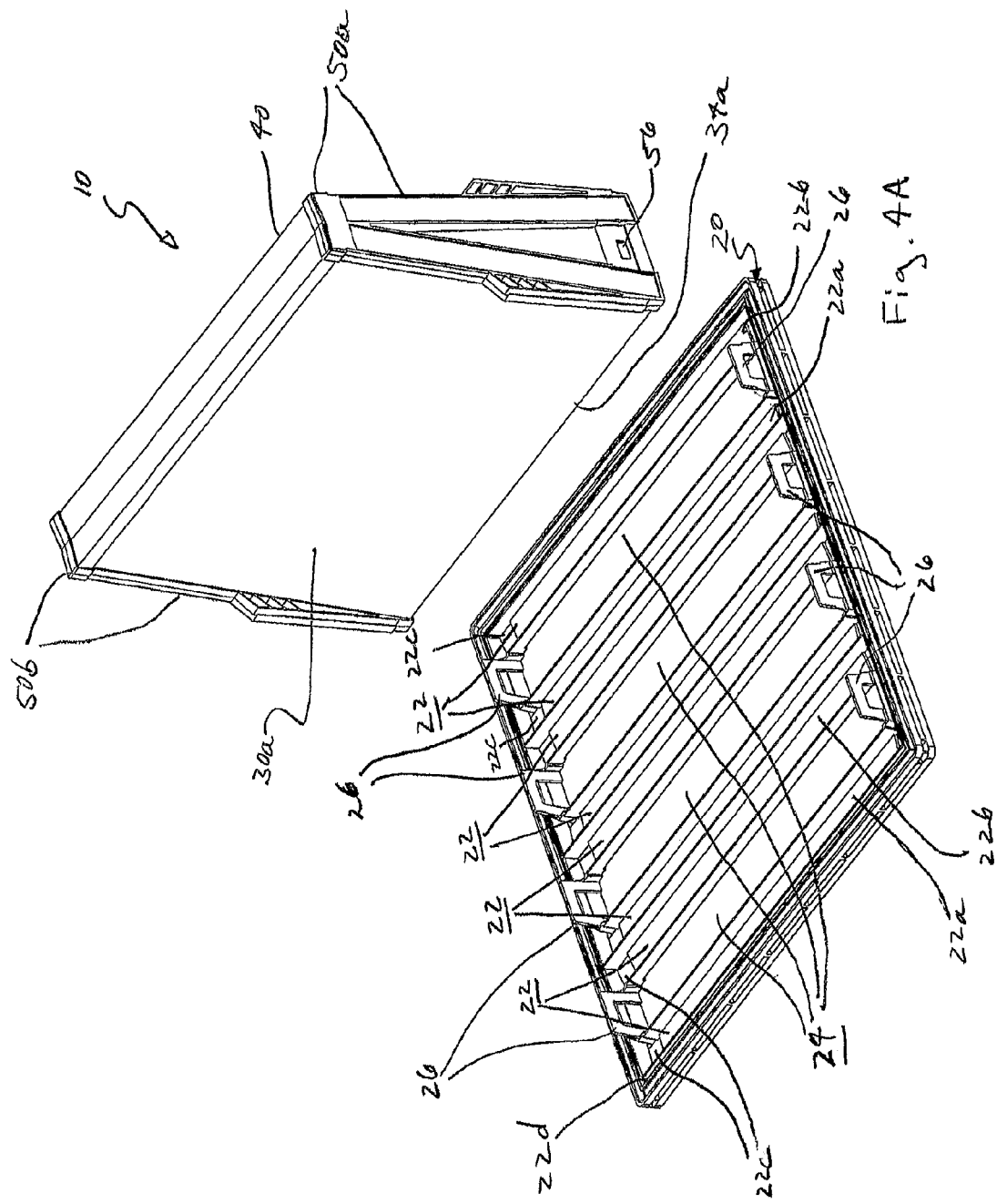

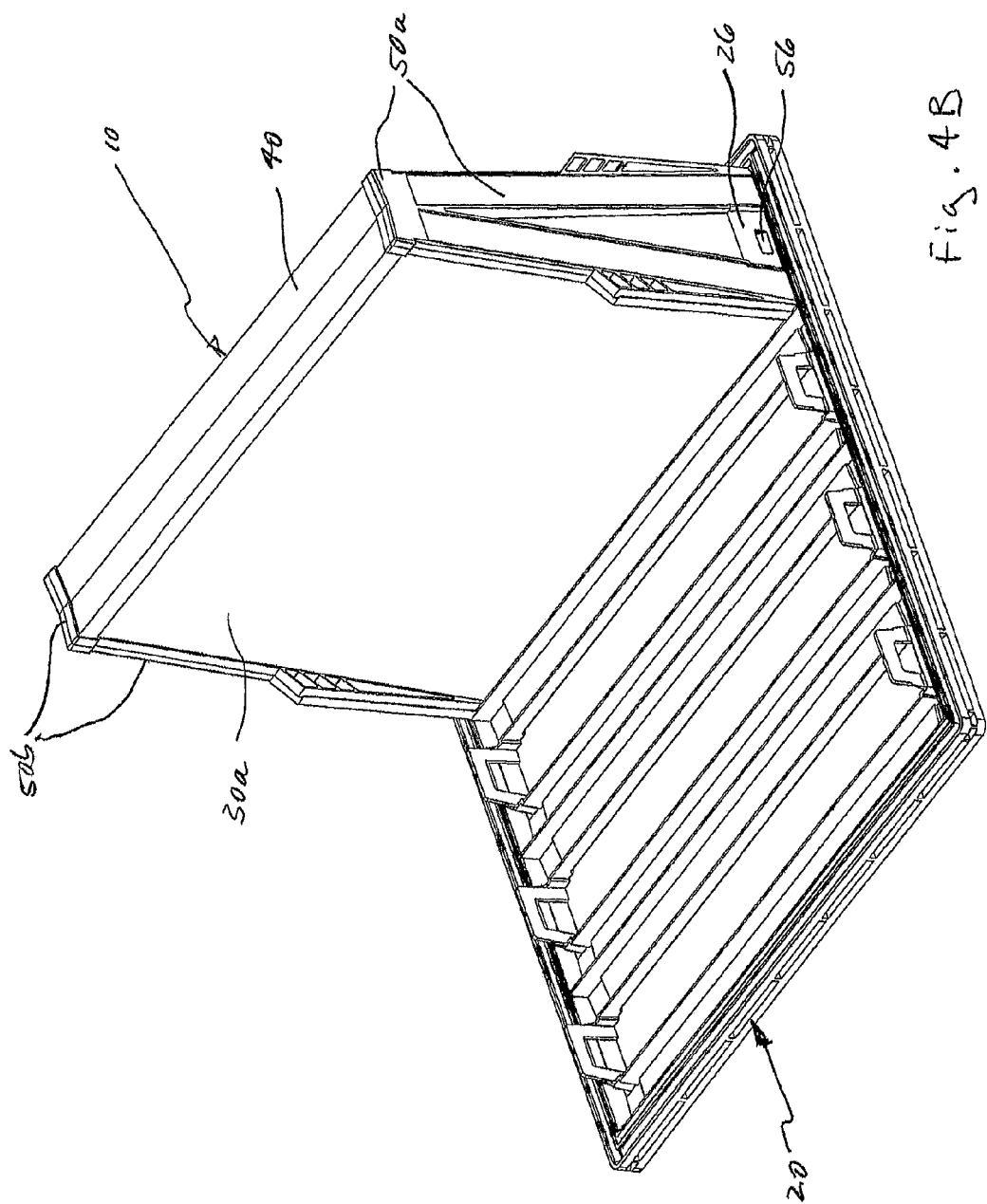

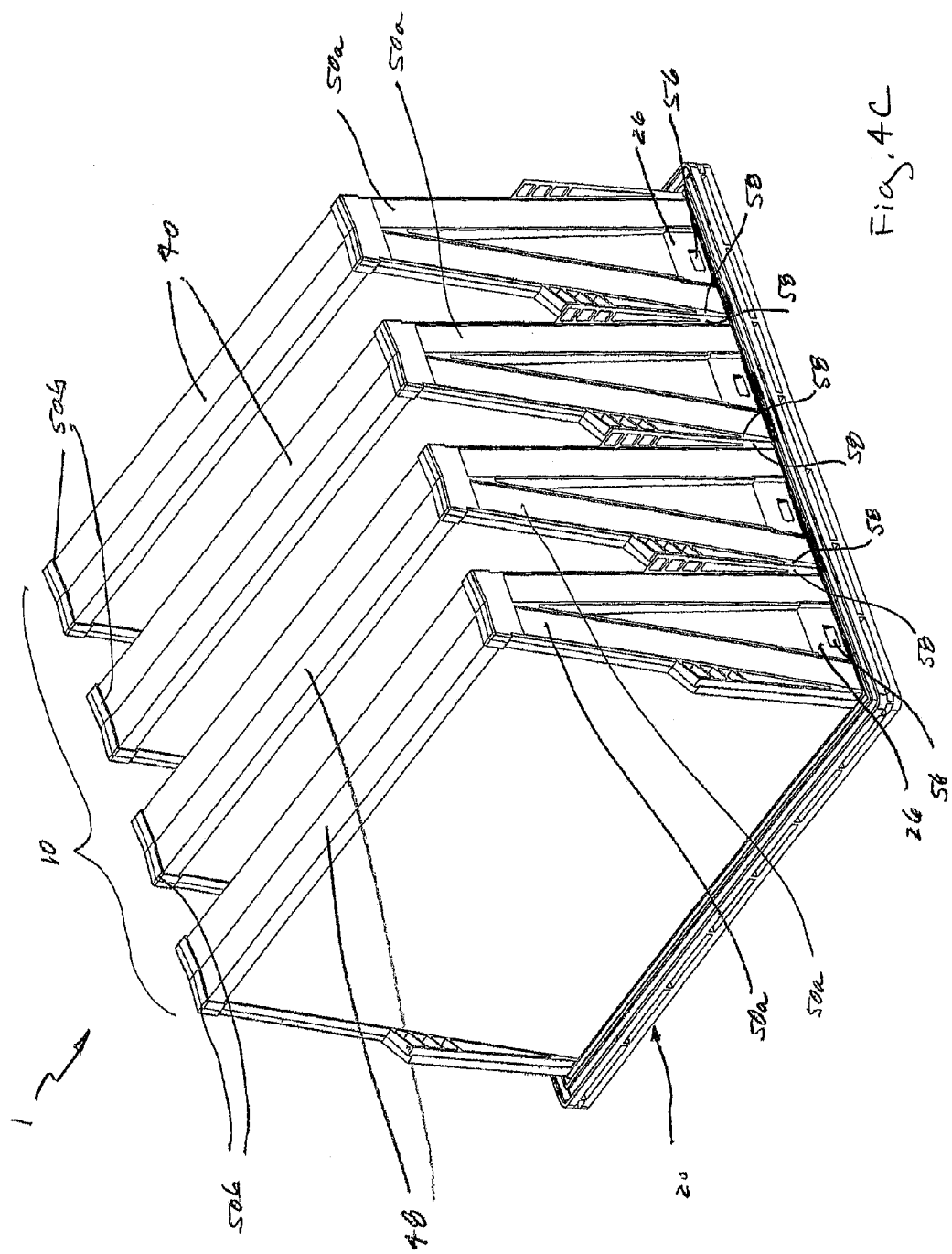

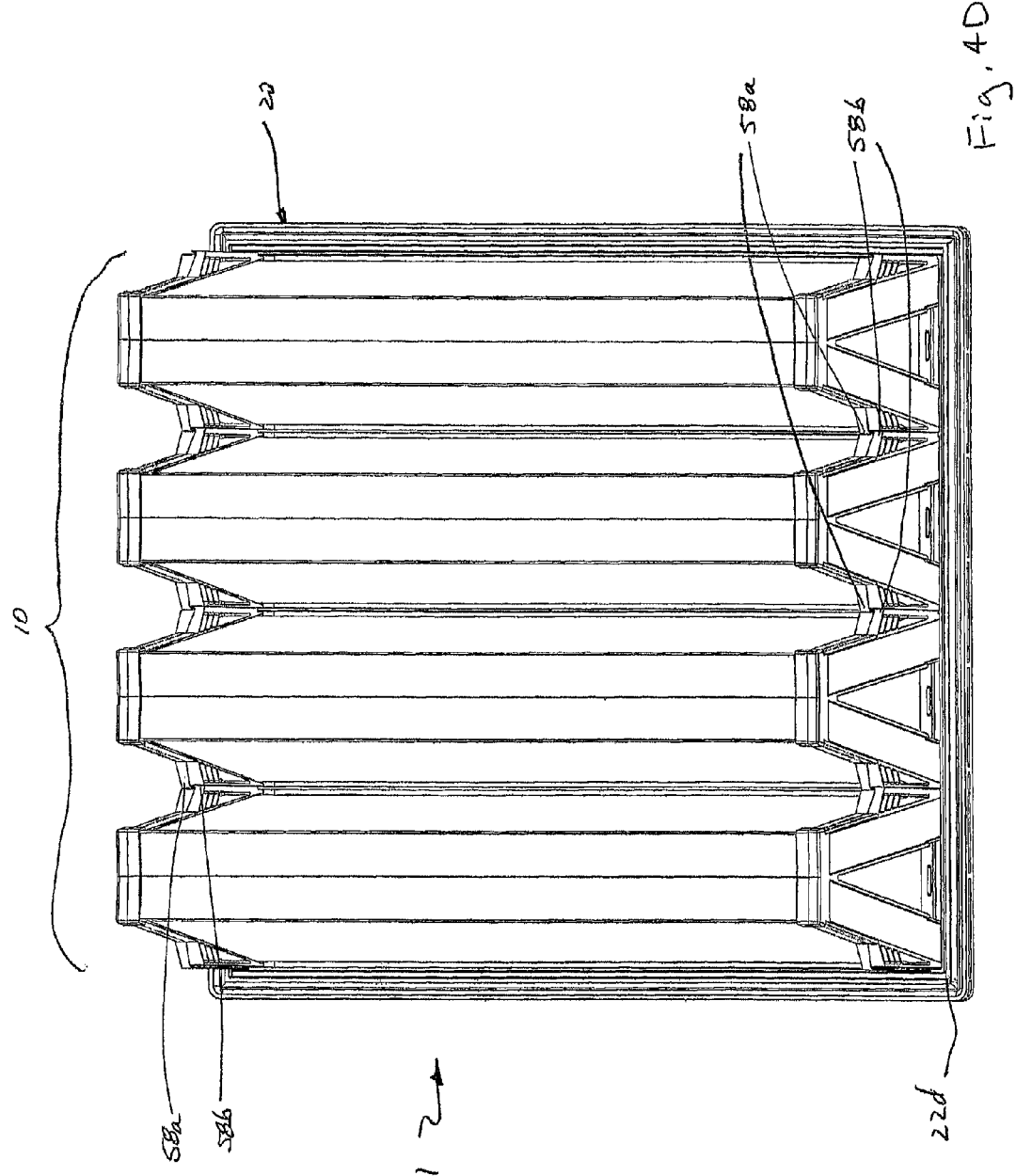

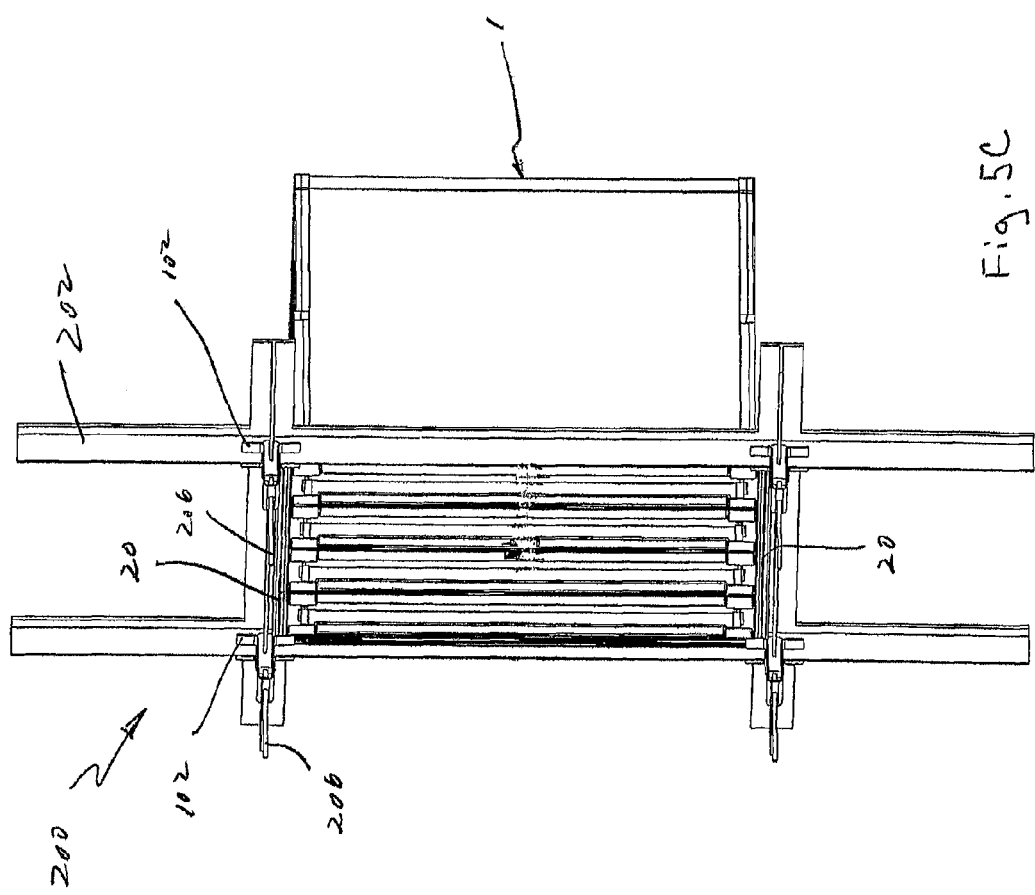

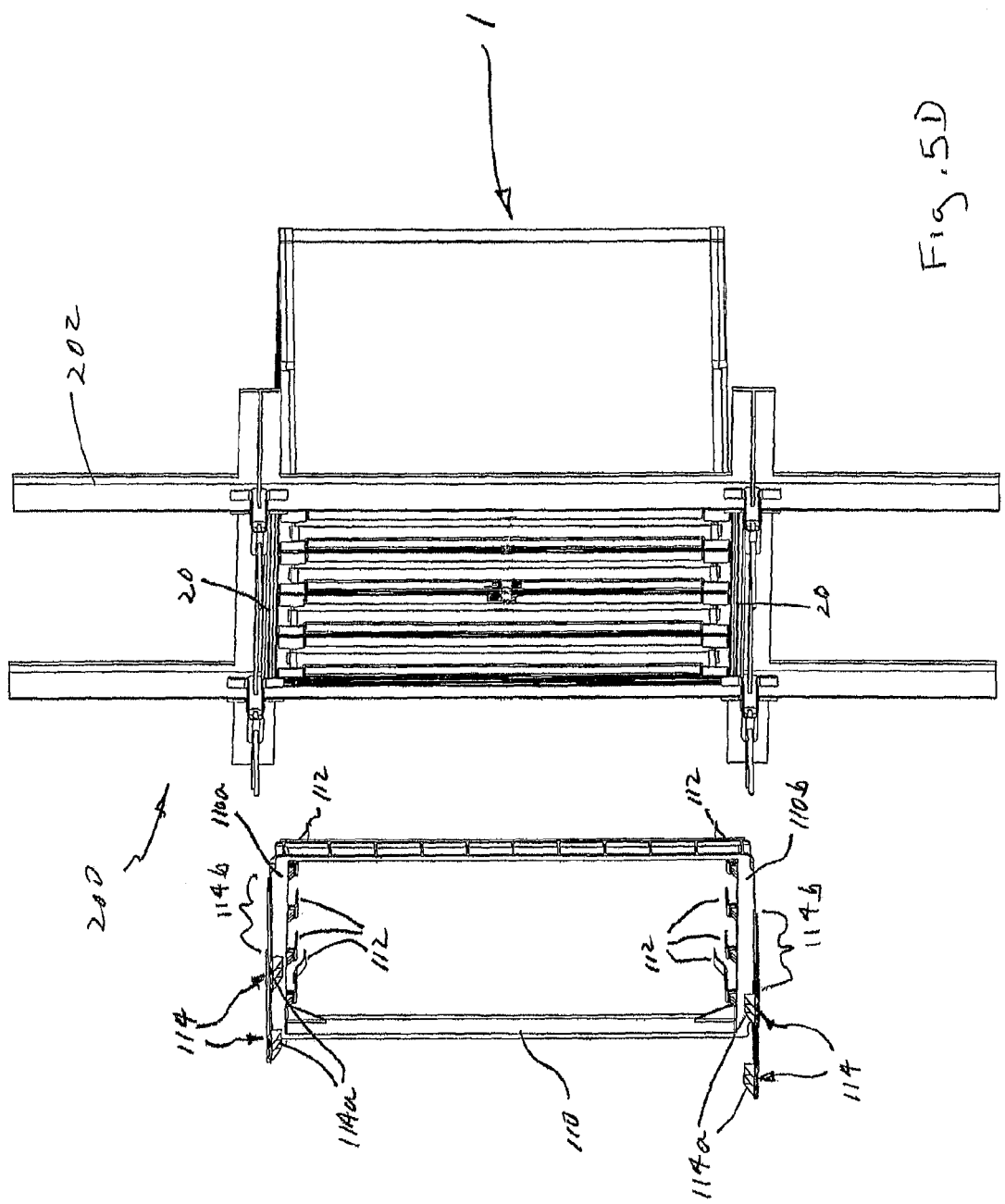

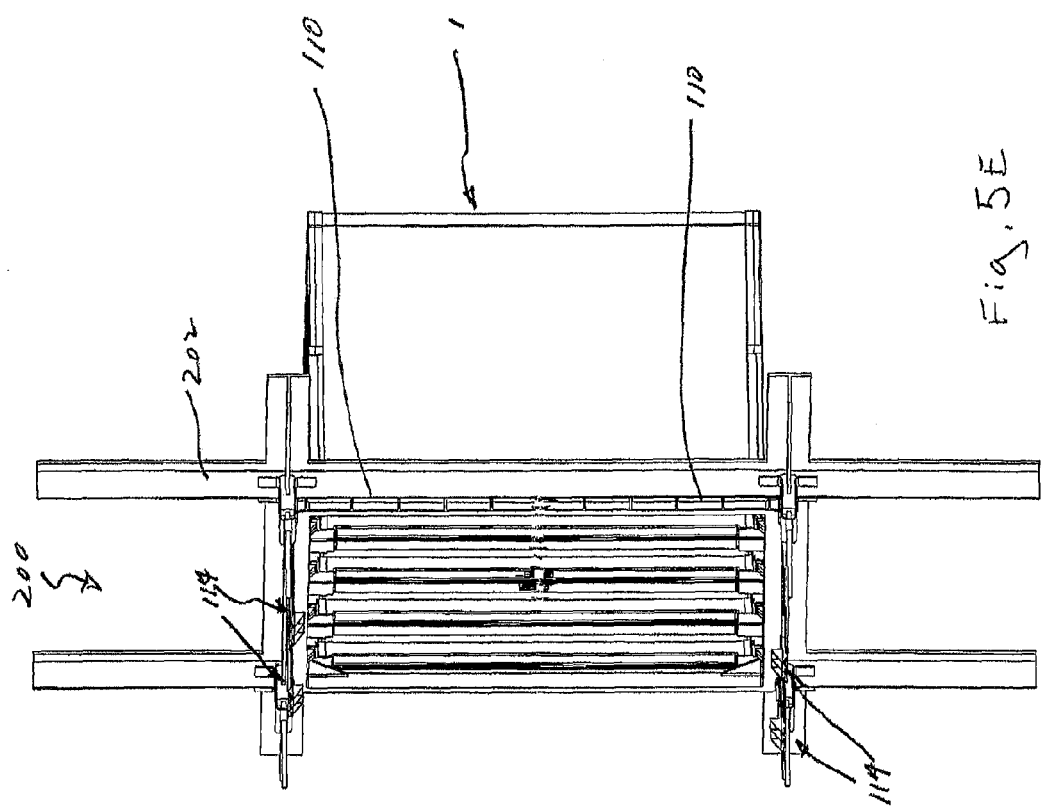

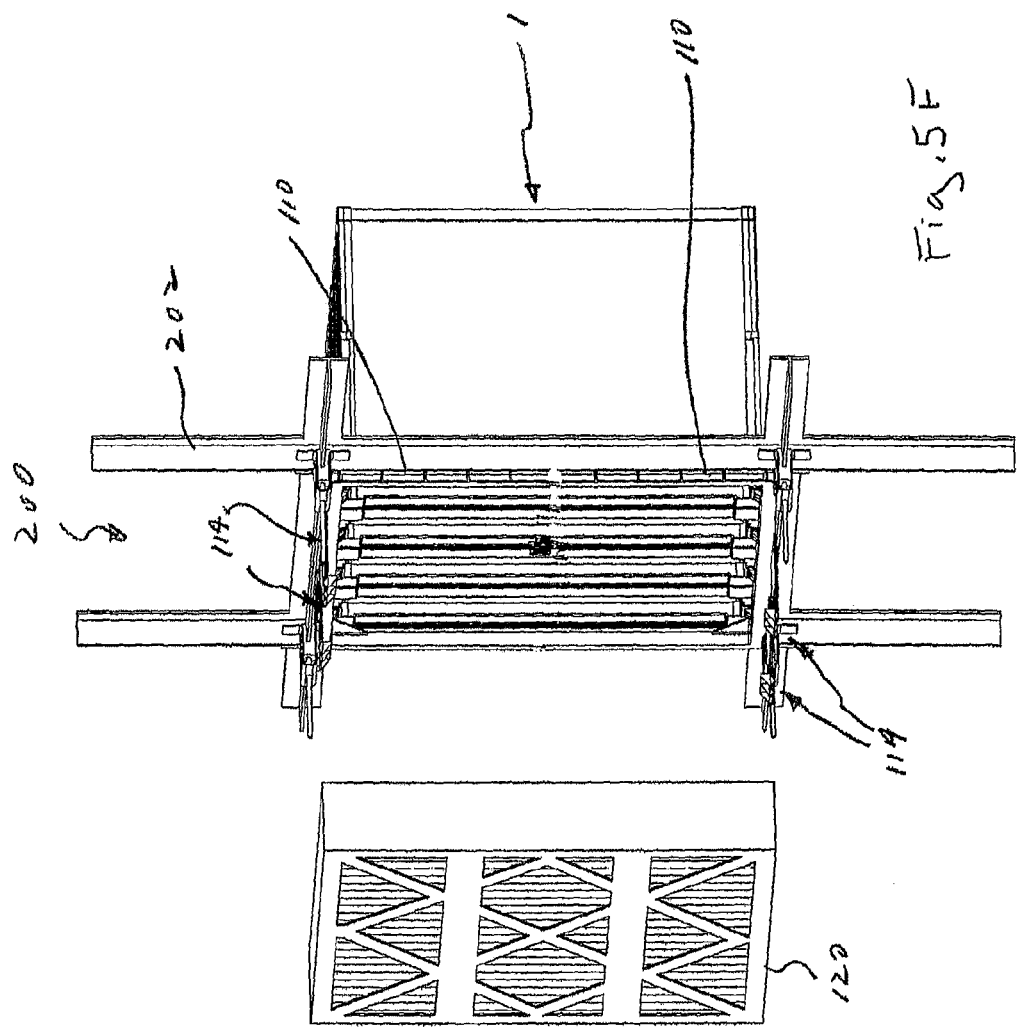

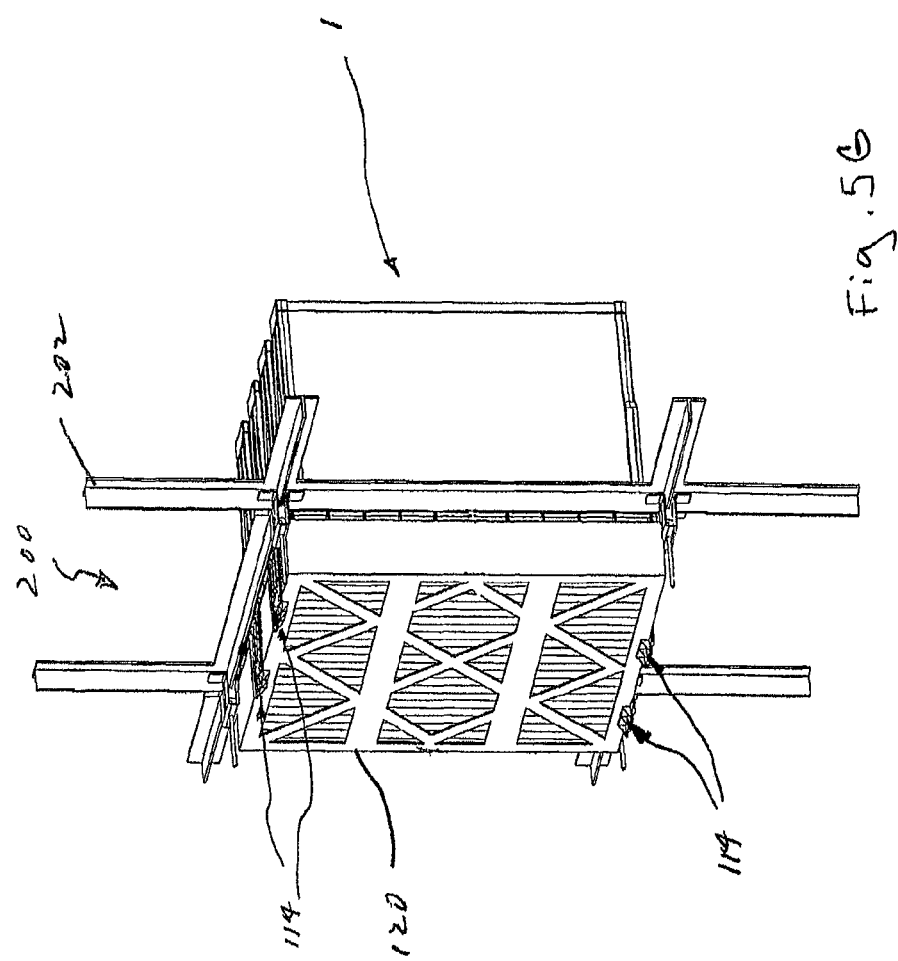

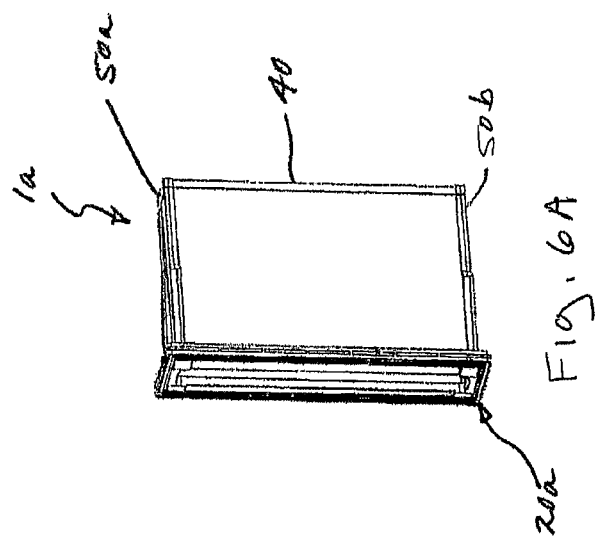

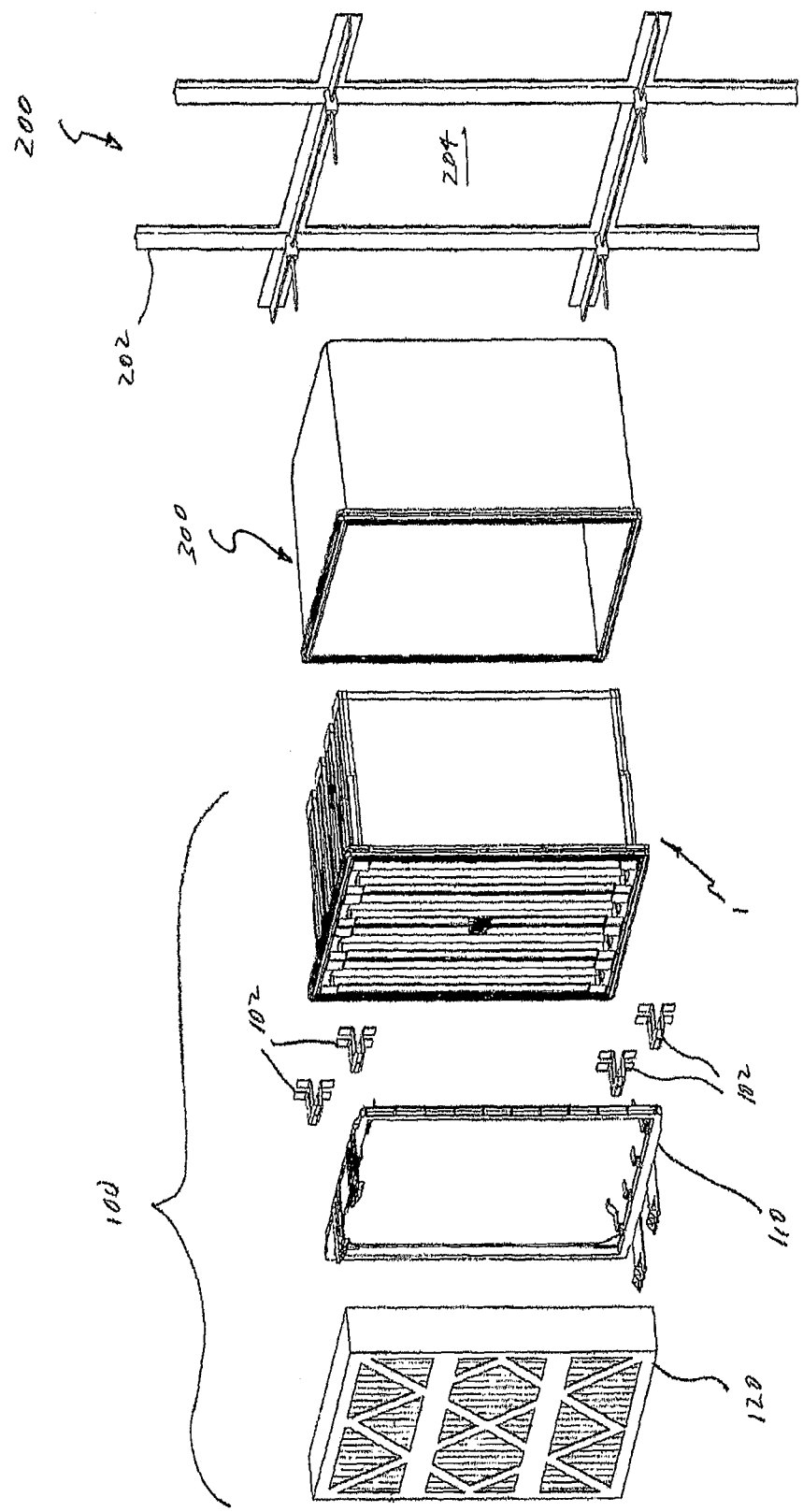

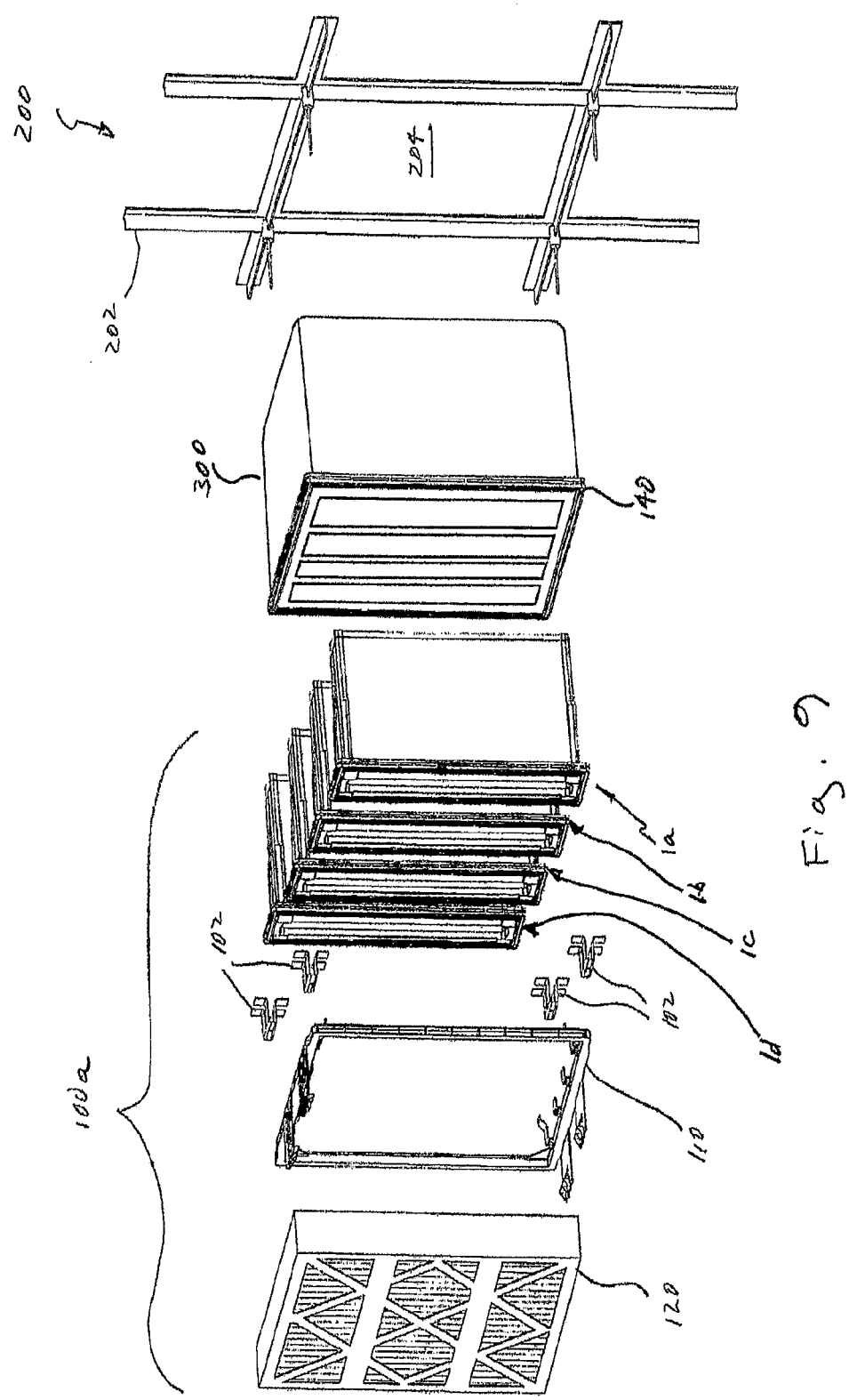

V-PANEL FILTERS

FIELD OF THE INVENTION

The present invention relates to filter apparatus, and more particularly, to air intake filters utilized in industrial applications.

BACKGROUND OF THE INVENTION

Filters are employed in a wide range of applications, including usages to filter intake air in building ventilation systems to large-scale industrial facilities and equipment. By way of example, air intake filters are utilized in connection with gas turbine combustion systems employed for power generation.

In such applications high volumes of air are utilized in the combustion process. In turn, high volume filtration apparatus are necessary to condition intake air streams for combustion optimization and for reducing wear on componentry. In this regard, it is desirable for such filter apparatus to provide for relatively high-volume gas filtration with relatively low pressure drop while providing reliable removal of particles and liquid from the intake air. In particular, in gas turbine applications, the removal of relatively small particles and liquid is desirable to minimize degradation of turbine componentry (e.g., corrosion of compressor blades) and loss of compressor efficiencies. As may be appreciated, replacement of turbine componentry is not only expensive, but may also entail significant down-time.

In order to realize high volume air filtration, V-panel filters are often employed. In V-panel filters, adjacent filter panels are generally oriented at acute angles to define a V-shaped configuration along and across an airstream. While V-panel filters yield high volume filtration, their configuration presents design challenges in relation to achieving reliable seal interfaces and overall durability.

SUMMARY OF THE INVENTION

An objective of the present invention is to provide a V-panel filter apparatus adapted for high volume applications with improved component sealing to reduce undesired particle and/or liquid passage therethrough (e.g., gas combustion turbine applications).

Another objective of the present invention is to provide a V-panel filter apparatus that yields improved filter production efficiencies while also providing improved filter performance.

Another objective of the present invention is to provide an improved V-panel filter apparatus that is easy to install and replace.

Yet another objective of the present invention is to provide a V-panel filter apparatus yielding improved filtration performance while also providing enhanced durability for increased reliability.

One or more of the above objectives and additional advantages may be realized in an embodiment of a V-shaped filter apparatus that includes one or a plurality of V-shaped filter members sealably disposed relative to a header member. Each V-shaped filter member may include first and second filter panels each having a first end edge surface sealably disposed within potting material contained by one or more recess portion(s) of an end cap. The first and second filter panels may be disposed to diverge away from the end cap to define a V-shaped configuration.

A first side edge surface of each of the first and second filter panels may be sealably disposed within potting material contained by one or more recess portion(s) in a first side plate that encloses a first side of the V-shaped filter member. A second side edge surface of each of the first and second filter panels may be sealably disposed within potting material contained by one or more recess portion(s) of a second side plate that encloses a second side of the V-shaped filter member.

Further, a second end edge surface of each of the first and second filter panels may be sealably disposed within potting material contained by one or more recess portion(s) of the header member. As will be appreciated, the inclusion of the recess portions to contain potting material facilitates pot-and-place production procedures so that all edge surfaces of the first and second filter panels may be sealably disposed relative to an interfacing one of the header member, end cap, and first or second side plate, thereby yielding an improved, water-tight, V-panel filter apparatus. Pot-and-place production procedure refers to the assembly technique by which the potting material is first dispensed into a recess portion of an element, and subsequently the filter panel edge surface is introduced into the potting material.

In some implementations, each V-shaped filter member may be provided so that the first and second side plates may be supportably disposed relative to the header member. In turn, the first and second filter panels may be supportably and sealably disposed relative to the header member and first and second side plates, and the end cap may be supportably and sealably disposed relative to the first and second filter panels.

In one approach, the first and second side plates of each V-shaped filter member may be provided for mechanical interconnection with the header member, e.g., via snap-fit engagement, thereby facilitating assembly and enhancing stability/durability. In this regard, complimentary snap-fit member sets may be provided on the header member and first and second side plates, wherein at least one of each set of complimentary snap-fit members may be elastically deformable for spring-loaded securement of the header member and first and second side plates.

In one embodiment, the header member may be provided with elastically-deformable projection members across top and bottom frame portions, and the first and second side plates may be provided with complimentary, ramp-shaped projections, wherein upon relative advancement of the header member and V-shaped filter member, the projection members may engage and be deflected outward by the ramp-shaped projections until the projection members clear the end of the ramp-shaped projections to snap-fit into secure engagement with the first and second side plates. Such engagement may serve to support and facilitate fixed positioning of the V-shaped filter member relative to the header member.

In various embodiments, the recess portions of the header member, first and second side plates and/or end cap may be of a channel-shaped configuration. In one approach, the first side plate and/or second side plate may comprise a V-shaped recess portion sized to receive corresponding ones of the first or second edge surfaces of the first and second filter panels. Correspondingly, the first side plate and/or second side plate may be of triangular configuration (e.g., an isosceles triangle) wherein one side of the triangular first and/or second side plate is located adjacent the header member and the other two sides thereof extend from the header member to an apex.

In some implementations, the recess portions of the first side plate and/or second side plate may be sized to receive therewithin, and thereby capture, an end portion of the end cap. For example, an apex portion of a V-shaped recess portion of the first and/or second side plate may be enlarged to receive an end portion of the end cap therein. In turn, such mechanical capture of the end cap yields further enhanced stability, such as, for example, by communicating forces applied to the end cap (e.g., as a result of air stream pressure applied to the filter panels) to the first and second side plates, and in turn, to the header member.

For each V-shaped filter member, the header member may comprise recess portions that extend along each side of an opening sized in corresponding relation to the open V-end of the V-shaped filter member. Complimentary snap-fit member sets may be disposed on the header member and first and second side plates for engagement adjacent to each end of the corresponding opening.

In some implementations, the recess portions of the header member may be sized to receive therewithin, and thereby capture, an end portion of the first and/or second side plate. For example, an end region of one or more of the recess portions of the header member may be enlarged to receive an end portion of a side of a triangularly-configured first or second side plate. In turn, further enhanced stability may be realized.

The recess portions of the end cap may include first and second floor portions that are angled relative to one another to accommodate adjacent, parallel positioning of the first end edge surfaces of the first and second filter panels relative thereto. Similarly, the recess portions on each side of the opening(s) of the header member may include floor portions that are angled relative to one another to accommodate adjacent, parallel positioning of the second end edge surfaces of the first and second filter panels relative thereto.

In some embodiments, a plurality of V-shaped filter members may be sealably disposed relative to a common header member. Each of such plurality of V-shaped filter members may be supportably disposed relative to the header member and may comprise some or all of the features noted above. In such arrangements, the common header member may comprise a corresponding plurality of openings with a corresponding plurality of sets of recess portions extending along such openings. Further, a corresponding plurality of complimentary snap-fit member sets may be provided on the header member adjacent to each end of the plurality of openings for interconnection with the first and second side plates of each of the plurality of V-shaped filter members.

A plurality of V-shaped filter members may be provided in some implementations so that, when the V-shaped filter members are disposed relative to the header member, strut members extend between adjacent ones of the V-shaped filter members to enhance stability. In one approach, the first side plate and/or second side plate of each V-shaped filter member may comprise a projecting strut member along at least a portion thereof, wherein strut members of adjacent V-shaped filter members mechanically engage to enhance stability. Optionally, the strut members may be provided with retention portions (e.g., U-shaped edge channels) for slidable, interlocking engagement between adjacent ones of the V-shaped filter members.

In some implementations, the V-panel filter apparatus may further include a prefilter support frame that is supportably connected to and disconnectable from the header member. In one approach, the prefilter support frame may comprise a first plurality of projection members that are elastically deformable for supportable engagement with the header member. In one arrangement, the prefilter support frame may comprise a first plurality of projection members that extend through one or a plurality of the opening(s) of the header member for selective interconnection to and disconnection from the header member and/or one or more of the first and second side plates.

The prefilter support frame may be adapted to support a prefilter filter. More particularly, the prefilter support frame may be provided so that a prefilter filter may be selectably, supportably interconnected to the prefilter support frame and disconnected and removed from the prefilter support frame, thereby facilitating replacement of the prefilter filter without removing the prefilter support frame from the header member of the V-panel filter apparatus.

In one approach, the prefilter support frame may comprise a second plurality of projection members that are elastically deformable for supportive engagement of the prefilter filter. For example, a first plurality of projection members, as noted above, may project from a first side of the prefilter support frame and a second plurality of projection members may extend from a second side of the prefilter support frame. In certain implementations, the first plurality of projection members and/or second plurality of projection members may be provided so as to position the prefilter filter at a predetermined spaced distance away from the header member of the V-panel filter apparatus.

One or more of the above objectives and additional advantages may also be realized in an embodiment of a method of assembling a V-panel filter apparatus that comprises, for each of one or more V-panel filter members, flowing a curable potting material into at least one recess portion (e.g., upward facing) of an end cap, wherein the potting material is contained by the recess portion. The method further comprises positioning (e.g., submerging) a first end edge surface of each of a first filter panel and second filter panel into the potting material contained by the recess portion of the end cap (e.g., by vertically advancing the first end edge surfaces into the contained potting material). In turn, the method may include curing the potting material contained by the recess portion of the end cap to seal the first end edge surfaces of the first and second filter panels within the contained potting material, wherein that first and second filter panels are positioned to extend upward and diverge away from the end cap to define a V-shaped configuration.

In some embodiments, the method may include the steps of flowing a curable potting material into at least one recess portion (e.g., upward facing) of a first side plate, and positioning (e.g., submerging) a first side edge surface of each of the first and second filter panels into the contained potting material (e.g., by vertically advancing the first side edge surfaces into the contained potting material). In turn, the method may include curing the potting material, where the first side edge surfaces of the first and second filter panels are sealably disposed. Additionally, the method may further include repeating the immediately above-noted steps so as to sealably dispose second side edge surfaces of the first and second filter panels in curable potting material flowed into and contained by at least one recess portion of a second side plate.

In one approach, the method may include sealing the first end edge surfaces of the first and second panels in potting material contained in the end cap, as described above, and positioning a first end portion of the end cap together with the first side edge surfaces of each of said first and second filter panels in potting material contained in the at least one recess portion of the first side plate. Further, the method may include sealing the first end edge surfaces of the first and second panels in potting material contained in the end cap, as described above, and positioning a second end portion of the end cap together with said second side edge surfaces of each of said first and second filter panels in potting material contained in the at least one recess portion of the second side plate.

In some embodiments the method may comprise flowing a curable potting material into at least one recess portion (e.g., upward facing) of a header member, wherein the potting material is contained by the recess portion, and positioning (e.g., submerging) a second end edge surface of each of the first and second filter panels into the potting material (e.g., by vertically advancing the second edge end surfaces into the contained potting material). In turn, the potting material may be cured to seal the second end edge surfaces of the first and second filter panels within the potting material contained by the recess portion(s) of the header member.

In contemplated method embodiments, the edge surfaces of the first and second filter panels may be sealed via separate pot-and-place assembly steps to yield a water tight interface between the first and second filter panels and the end cap, first side plate, second side plate, and header member. Such multi-step, pot-and-place assembly may also enhance unit integrity.

In some implementations, the method may include interconnecting the first and second side plates to the header member via snap-fit engagement. In this regard, such snap-fit engagement may be achieved in conjunction with the positioning of the second end edge surfaces of the first and second filter panels into the curable potting material flowed into and contained by the recess portion(s) of the header member. Snap-fit engagement may be realized using complementary members, at least one of which is elastically deformable, as otherwise described herein.

In some embodiments, the method steps employing potting material may employ a potting material having a relatively high viscosity. By way of example, potting material may be employed having a viscosity of at least 150 centipoise. As may be appreciated, potting materials having such relatively high viscosities may be advantageously employed due, at least in part, to pot-and-place assembly steps.

In some embodiments, a plurality of V-shaped filter members may be assembled utilizing method steps as described above. In one approach, such plurality of V-shaped filter members may be sealably and supportably disposed relative to a common header member. In such embodiments, adjacent ones of the plurality of V-shaped filter members may be provided to engage along at least a portion of the corresponding first side plates and corresponding second side plates. More particularly, the corresponding portions of the first side plates and second side plates may comprise U-shaped edge channels adapted for sliding, interlocking engagement in conjunction with the positioning of the corresponding V-shaped filter members relative to the common header member.

In certain implementations, the V-panel filter apparatus assembled in accordance with the foregoing method may include supportably mounting the header member of the V-panel filter apparatus at an intake port (e.g., an air intake to a gas combustion turbine system). In turn, the method may further include the supportable connection of a prefilter support frame to the mounted header member, where the prefilter support frame is adapted to supportably maintain a prefilter filter, and where the prefilter support frame is selectively connectable to and disconnectable from the header member. In addition, the method may include the selective positioning of a prefilter filter in supported relation to the prefilter support frame connected to the header member, where the prefilter filter is disposed in spaced relation to the header member, and wherein the prefilter filter is selectively removable from the prefilter support frame.

Numerous additional features and advantages of the present invention will become apparent to those skilled in the art upon consideration of the embodiment descriptions provided hereinbelow.

BRIEF DESCRIPTION OF THE DRAWINGS

FIGS. 2A and 2B are perspective assembly views of first and second filter panels and an end cap of the V-shaped filter embodiment of FIG. 1A.

FIGS. 3A and 3B are perspective assembly views of first and second filter panels, an end cap, and a first side plate of the V-shaped filter embodiment of FIG. 1.

FIGS. 3C and 3D are perspective assembly views of first and second filter panels, an end cap, and first and second side plates of the V-shaped filter embodiment of FIG. 1.

FIGS. 4A and 4B are perspective assembly views of a V-shaped filter member and header member of the V-shaped filter embodiment of FIG. 1.

FIGS. 4C and 4D are perspective views of the fully-assembled V-shaped filter embodiment of FIG. 1A.

FIGS. 5B-5G are perspective installation views of the V-shaped filter embodiment of FIG. 1A and optional componentry of the filter apparatus embodiment of FIG. 5A at an air intake part.

FIG. 6A is a perspective view of another embodiment of a V-shaped filter.

FIG. 8 is an exploded perspective view of another filter apparatus embodiment including the V-shaped filter embodiment of FIG. 6A and safety filter embodiment of FIG. 7 and componentry employable therewith at an air intake port.

FIG. 9 is an exploded perspective view of another filter apparatus embodiment including the V-shaped filter embodiment of FIG. 6A and componentry employable therewith at an air intake port.

DETAILED DESCRIPTION

Figure 1A:
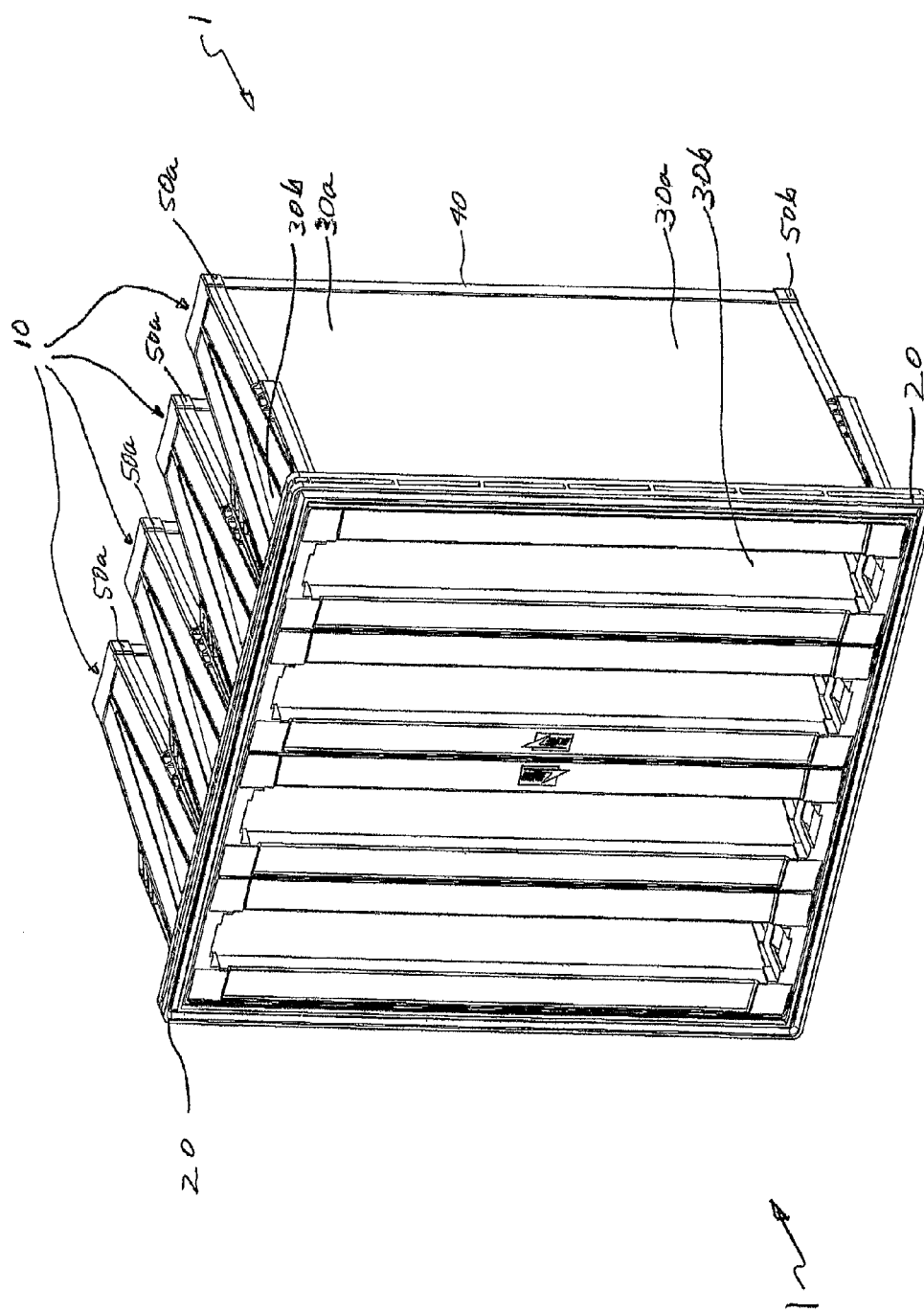
FIG. 1A is a perspective view of one embodiment of a V-shaped filter.
Figure 1B:
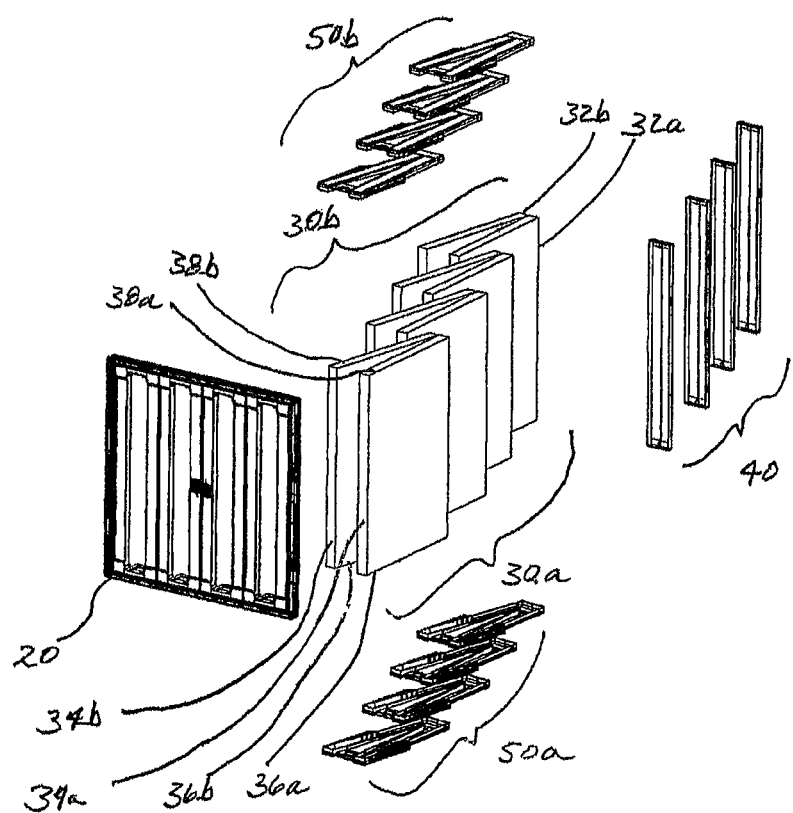
FIG. 1B is an exploded perspective view of the V-shaped filter embodiment of FIG. 1A.

One embodiment of a V-panel filter 1 is shown in FIGS. 1A and 1B. In the illustrated embodiment, V-panel filter 1 includes four V-shaped filter members 10 sealably disposed relative to a header member 20. For example, the V-shaped filter members 10 and header member 20 may be provided so that the V-shaped filter members 10 are supportably and sealably interconnected to the header member 20 to facilitate handling of the V-panel filter 1 as a single unit, e.g., during installation and/or replacement of the V-panel filter 1. While FIGS. 1A and 1B illustrate four V-shaped filter members 10, it should be appreciated that various described features may be utilized in arrangements that utilize one or a different plurality of V-shaped filter members.

As will be further described, each of the V-shaped filter members 10 may include first and second filter panels 30a, 30b sealably disposed along first end edge surfaces 32a, 32b relative to an end cap 40, and sealably disposed along second end edge surfaces 34a, 34b to header member 20. Further, the first and second filter panels 30a, 30b may be sealably disposed along first and second side edge surfaces 36a, 36b and 38a, 38b, respectively, to first and second side plates 50a, 50b, respectively. Advantageously, each of the seal interfaces along the edge surfaces of the first and second filter panels 30a, 30b may be a pot-and-place type interface.

The first and second filter panels 30a, 30b may be of pleated, flat, or other configuration. Suitable filter media materials for construction of first and second filter panels include: microfiberglass, cellulose, spunbonds, melt blowns, membrane, and combinations thereof. The first and second filter panels may advantageously comprise electrospun nanofiber web and microporous polymeric membrane (e.g., polytetrafluoroethylene, polypropylene, polyethylene) because of their ability to repel water penetration. The first and second filter panels 30a, 30b may have a filter rating of at least about E10, and preferably about E12 or greater (e.g., as determined in accordance with filter testing European Standard EN1822:2009).

As noted, first and second filter panels 30a, 30b may comprise microporous polymeric membranes. Microporous polymeric membranes have demonstrated dependability and reliability in removing particles and organisms from fluid streams. Such membranes are usually characterized by their polymeric composition, air permeability, water intrusion pressure and filtration efficiencies.

A variety of microporous polymeric membranes can be used, depending on the requirements of the application. The membrane may be constructed from the following exemplary materials: nitrocellulose, triacetyl cellulose, polyamide, polycarbonate, polyethylene, polypropylene, polytetrafluoroethylene, polysulfone, polyvinyl chloride, polyvinylidene fluoride, acrylate copolymer.

The first and second filter panels 30a, 30b may be preferably constructed from a hydrophobic material that is capable of preventing the passage of liquids. The first and second filter panels 30a, 30b should be able to withstand the applied differential pressure across the filter media without any liquid passing through it. The membrane may have a water intrusion pressure from about 0.2 bar to about 1.5 bar and an average air permeability from about 7 Frazier to about 100 Frazier or from about 10 Frazier to about 40 Frazier (as determined under test standard ASTM F778).

The first and second filter panels 30a, 30b may comprise a microporous fluoropolymer, such as polytetrafluoroethylene (PTFE), fluorinated ethylenepropylene (FEP), perfluoroalkoxy polymer (PFA), polypropylene (PP), polyurethane (PU), polyethylene (PE), or ultra high molecular weight polyethylene (UHMWPE).

In exemplary embodiments, first and second filter panels 30a, 30b may comprise expanded polytetrafluoroethylene (ePTFE) membranes. Suitable ePTFE membranes are described in U.S. Pat. No. 5,814,405. The membranes described therein have good filtration efficiency, high air flow and burst strength. Such ePTFE membranes are available from W. L. Gore and Associates, Inc. of Newark, Del. However, it is to be appreciated that ePTFE membranes constructed by other means can also be used.

The first and second filter panels 30a, 30b may optionally contain a filler material to improve certain properties of the filter. Suitable fillers include, but are not limited to, carbon black or other conductive filler, catalytic particulate, fumed silica, colloidal silica or adsorbent materials such as activated carbon, or ceramic fillers, such as activated alumina, and titanium dioxide ($TiO_2$). Methods of preparing filled membranes useful in the present invention are fully described in U.S. Pat. No. 5,814,405.

As noted, first and second filter panels 30a, 30b may comprise a melt blown material in the form of a web. Melt blown webs are produced by entraining melt spun fibers with convergent streams of heated air to produce extremely fine filaments. Melt blown processing forms continuous sub-denier fibers with relatively small diameter fibers that are typically less than 10 micron.

First and second filter panels 30a, 30b may comprise melt blown polymer fiber web layer(s) that may be made from a variety of polymeric materials, including polypropylene, polyester, polyamide, polyvinyl chloride, polymethylmethacrylate, and polyethylene. Polypropylene is among the more utilized polymeric materials. Typically, the polymer fibers that form the web have a diameter in the range of about 0.5 micron to about 10 micron, or from about 1 micron to about 5 micron. The basis weight of a melt blown polymer fiber web may, for example, be in the range from about 1 $g/m^2$ to about 100 $g/m^2$ or from about 10 $g/m^2$ to about 50 $g/m^2$ A melt blown filtration media may include at least one electret filter media layer comprising a highly efficient layer having an electrostatic charge. Electric charge can be imparted to melt blown fibrous webs to improve their filtration performance using a variety of known techniques. For example, a suitable web may be conveniently cold charged by sequentially subjecting the web to a series of electric fields, such that adjacent electric fields have substantially opposite polarities with respect to each other, such as in the manner taught in U.S. Pat. No. 5,401,446, to Tsai et al. As described therein, one side of the web is initially subjected to a positive charge while the other side of the web is initially subjected to a negative charge. Then the first side of the web is subjected to a negative charge and the other side of the web is subjected to a positive charge. However, electret filter materials may also be made by a variety of other known techniques.

The first and second filter panels 30a, 30b may optionally comprise a composite filter media incorporating a microporous polytetrafluoroethylene membrane and an electrostatic melt blown web, such as in the manner taught in U.S. Pat. Nos. 7,501,003 and 8,147,583. Such composite filter media has shown utility in industrial air filtration applications due to its dependability and reliability to capture submicron particles and repel water.

First and second filter panels 30a, 30b may also comprise nanofibers. In that regard, electrostatic spinning (electrospinning) processes allow production of synthetic fibers of small diameter and high surface areas which are also known as nanofibers. The electrospinning process involves subjecting a polymeric solution to electrostatic charge in the presence of a strong electric field, such as a high voltage gradient. Introduction of electrostatic charge to polymeric fluid results in formation of a jet of charged fluid. The charged jet of polymeric fluid accelerates and thins in the electrostatic field and is attracted toward a collector. In such process, viscoelastic forces of polymeric fluids stabilize the jet, forming a small diameter fine fibers. Examples of polymers include polyvinyl chloride (PVC), polyolefin, polyacetal, polyester, cellulose ether, polyalkylene sulfide, polyarylene oxide, polysulfone, modified polysulfone polymers and polyvinyl alcohol, polyamide, polystyrene, polyacrylonitrile, polyvinylidene chloride, polymethyl methacrylate, and polyvinylidene fluoride.

An electrospun nanofiber media layer may have a thickness between about 50 nm and about 5 micron or between about 100 nm and about 500 nm; and a basis weight between about 0.001 g/m² and about 0.05 g/m², preferably between about 0.01 g/m² and about 0.02 g/m², and in one embodiment about 0.013 g/m². The fibers of the electrospun media layer have a median fiber diameter of less than about 1 micron, less than about 0.8 micron, or between about 50 and about 700 nanometers, or less.

Nanofibers may also be produced by other known methods. By way of example, nanofibers may be produced utilizing centrifugal force (e.g., such as described by U.S. Patent Publication No. US2009/0280325A1 and U.S. Patent Publication No. US2008/0242171), where a composition that includes one or more polymers are located in the body of a fiber producing device and the device is rotated at a speed sufficient to eject material from the fiber producing device to form nanofibers.

The header member 20, end cap 40, and first and second side plates 50a, 50b may be of a rigid construction. By way of example, such components may be molded or extruded and may comprise suitable materials, including: polystyrene, polycarbonate, acrylic, acrylonitrile butadiene styrene (ABS), polyamide, acetal, polyvinyl chloride, cellulose, polyester, polyethylene, fluoroplastics, polyimide, polyamide, polypropylene, polysulfone, melamine, phenolic, urethane, polyetheretherketone, perfluoroalkoxy, polyvinylidene fluoride, and filled composites (e.g., filled with glass, carbon fibers, pigments, metals and combinations thereof).

One approach for assembly of the V-panel filter 1 will now be presented. As shown in FIG. 2A, assembly may include sealing disposition of first end edge surfaces 32a, 32b of first and second filter panels 30a, 30b relative to end cap 40. To do so, a curable potting material (not shown) may be flowed into an upward-oriented recess portion 42 of the end cap 40. By way of example, a sufficient quantity of curable potting material may be flowed into the recess portion 42 to ensure that the entirety of first end edge surfaces 32a, 32b may be advanced into (e.g., vertically) and submerged within the curable potting material upon positioning of the first and second filter panels 30a, 30b within the recess portion 42 of the end cap 40.

Figure 2B:
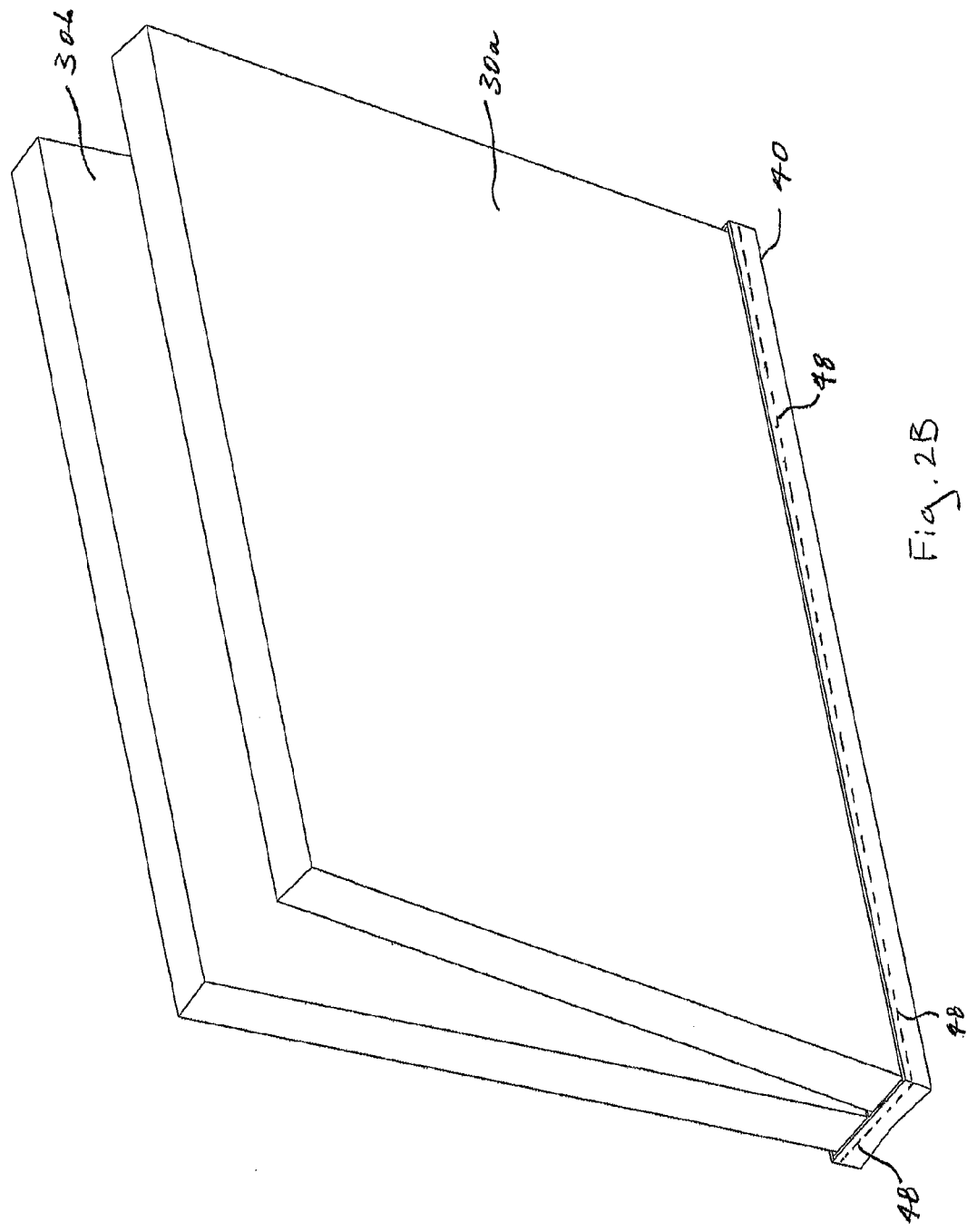

As shown in FIG. 2A, the recess portion 42 of end cap 40 may be provided with first and second floor portions 44a, 44b that are each substantially planar and oriented at a slight angle to one another. Further, positioning tabs 46 may be provided within the recess portion 42 between end portions of the first and second floor portions 44a, 44b of the end cap 40. In turn, such features facilitate positioning of the first end edge surfaces 32a, 32b of first and second filter panels 30a, 30b so that the first and second filter panels 30a, 30b extend upward from end cap 40 and diverge from each other at a predetermined angle when located in end cap 40, as shown in FIG. 2B. In this regard, the first end edge surfaces 32a, 32b of the first and second filter panels 30a, 30b may be disposed within the contained potting material, adjacent and parallel to the first and second floor portions 44a, 44b of end cap 40. As noted above and shown by phantom lines 48 in FIG. 2B, the curable potting material may be provided so as to completely cover and thereby seal the first end edge surfaces 32a, 32b of the first and second filter panels 30a, 30b.

Suitable potting materials may include the following: urethanes, silicone, epoxy, PVC hot melts, plastisol, methyl methacrylate, cyanoacrylate, fluorosilicone. Due to the pot-and-place approach described above, potting materials may be utilized that have a relatively high viscosity, e.g., 150 centipoise or more. After positioning of the first and second filter panels 30a, 30b relative to end cap 40, as shown in FIG. 2B, the curable potting material may be cured by any of a number of approaches, including for example: heat, induction, UV, anaerobic, solvent evaporation and moisture.

As shown in FIG. 3A, the first and second filter panels 30a, 30b, together with end cap 40, may be positioned for sealing disposition of first side edge surfaces 36a, 36b and an end portion of end cap 40 relative to first side plate 50a. In that regard, a curable potting material (not shown) may be flowed into an upward oriented recess portion 52a of the first side plate 50a.

The recess portion 52a may be of a V-shaped channel configuration corresponding with the V-shaped configuration defined by the first side edge surfaces 36a, 36b. Further, the recess portion 52a may include an enlarged portion 54a configured for positioning, and thereby capturing, an end portion of end cap 40 therewithin. As shown in FIG. 3A, first side plate 50a maybe of a triangular configuration, such as, but not limited to, an isosceles triangle.

As will be further described below, first side plate 50a may include a ramp-shaped, surface portion 56 in a V-shaped web portion 57 for use in realizing snap-fit engagement with header member 20. Further, first side plate 50a may include peripheral strut members 58 to provide strength and stability as will become apparent upon further description hereinbelow.

A sufficient quantity of curable potting material may be flowed into the recess portion 52a to ensure that the entirety of the first side edge surfaces 36a, 36b and an end portion of end cap 40 may be advanced into (e.g., vertically) and submerged within the curable potting material upon positioning of the first and second filter panels 30a, 30b within the recess portion 52a of the first side plate 50a, as shown in FIG. 3B. In such assembled position, the first side plate 50 encloses the entire corresponding side of the V-panel filter 1. After such positioning, the curable potting material may be cured. In this regard, suitable potting materials and curing approaches may be utilized as described above.

As shown in FIG. 3C, the first and second filter panels 30a, 30b, together with end cap 40 and first side plate 50a may be positioned for sealing disposition of second side edge surfaces 38a, 38b and an end portion of end cap 40 relative to second side plate 50b. In that regard, a curable potting material (not shown) may be flowed into an upward oriented recess portion 52b of the second side plate 50b.

The recess portion 52b may be of a V-shaped channel configuration corresponding with the V-shaped configuration defined by the second side edge surfaces 38a, 38b. Further, the recess portion 52b may include an enlarged portion 54b configured for positioning, and thereby capturing, an end portion of end cap 40 therewithin. As shown in FIG. 3A, second side plate 50b maybe of a triangular configuration, such as, but not limited to, an isosceles triangle.

As will be further described below, second side plate 50b may include a ramp-shaped, surface portion 56 in a V-shaped web portion 57 for use in realizing snap-fit engagement with header member 20. Further, second side plate 50b may include peripheral strut members 58 to provide strength and stability as will become apparent upon further description hereinbelow.

A sufficient quantity of curable potting material may be flowed into the recess portion 52b to ensure that the entirety of the second side edge surfaces 38a, 38b and an end portion of end cap 40 may be advanced into (e.g., vertically) and submerged within the curable potting material upon positioning of the first and second filter panels 30a, 30b within the recess portion 52b of the second side plate 50b, as shown in FIG. 3D. In such assembled position, the second side plate 50 encloses the entire corresponding side of the V-panel filter 1. After such positioning, the curable potting material may be cured. In this regard, suitable potting materials and curing approaches may be utilized as described above.

As may be appreciated, the assembly steps described in relation to FIGS. 2A, 2B, and 3A-3D may be carried out for each of the V-shaped filter members 10 utilized in V-panel filter 1. In turn, the completed V-shaped filter members 10 may be assembled together with header member 20, as will now be described in relation to FIGS. 4A-4D.

As shown in FIG. 4A, header member 20 may comprise a plurality of recess portions 22 for containing a curable potting material (not shown) and receipt of the second end edge surfaces 34a, 34b of the first and second filter panels 30a, 30b comprising each of the V-shaped filter members 10. More particularly, in the illustrated embodiment, four sets of channel-shaped recess portions 22 are provided by header member 20, wherein each set includes a channel-shaped recess portion 22 located on each side of an opening 24 through header member 20. Each opening 24 is sized in corresponding relation to the open V-end profile of V-shaped filter members 10. In the illustrated header member 20, each set of recess portions 22 may include one recess portion 22 having a first floor portion 22a and a second recess portion 22 having a second floor portion 22b that are each substantially planar and oriented at a slight angle to one another so that the second end edge surfaces 34a, 34b of the first and second filter panels 30a, 30b may be disposed within contained potting material adjacent and parallel to the first and second floor portions 22a, 22b of header member 20. Further, each channel-shaped recess portion 22 may include an enlarged portion 22c at each end thereof configured for positioning of end portions of first and second side plates therewithin 50a, 50b.

Header member 20 may further include projection members 26 at each end of openings 24 for use in realizing snap-fit engagement with the complimentary ramp-shaped, surface portions 56 of the first side plate 50a and second side plate 50b comprising V-shaped filter members 10. In one approach, the projection members 26 may be elastically deformable for snap-fit engagement over the complimentarily-configured surface portions 56. As may be appreciated, various other snap-fit engagement approaches may be utilized.

Header member 20 may further include recess portion 22d as shown in FIGS. 4A and 4D for receiving gasket material (e.g., ethylene propylene diene monomer, vinyl, neoprene, silicone, silicone foam, polyurethane foam, polyimide foam, polyethylene foam, etc). The gasket may advantageously be foam-in-place gasket (e.g., liquid foam, thixotropic foam).

A sufficient quantity of curable potting material may be flowed into the recess portions 22 (e.g., upward oriented) to ensure that the entirety of the second end edge surfaces 34a, 34b and end portions of first and second side plates 50a, 50b may be advanced into (e.g., vertically) and submerged within the curable potting material upon positioning of the first and second filter panels 30a, 30b within the recess portions 22 of the header member 20, as shown in FIG. 4B. After such positioning, the curable potting material may be cured. In this regard, suitable potting materials and curing approaches may be utilized as described above.

As may be appreciated, the assembly steps described in relation to FIGS. 4A and 4B may be carried out for each of the V-shaped filter members 10 utilized in the V-panel filter 1, thereby yielding a completed V-panel filter panel 1 as shown in FIG. 4C. As illustrated in FIG. 4C, the V-shaped filter members 10 may be positioned so that the complimentary surfaces 56 of first and second side plates 50a, 50b are positioned in snap-fit engagement with the projection members 26 of the header member 20, with second end edge surfaces 34a, 34b, of first and second filter panels 30a, 30b sealably disposed within curable potting material contained by the recess portions 22 of header member 20.

As noted above, first side plate 50a and second side plate 50b include strut members 58. The strut members 58 of adjacent V-shaped filter members 10 are disposed to laterally abut one another thereby enhancing stability. Further, and as best shown in FIG. 4D, strut members 58 of adjacently positioned V-shaped filter members 10 may include complimentary-shaped, retention portions 58a, 58b. The retention portions 58a, 58b may be provided for sliding interlocking engagement upon positioning of successive ones of the V-shaped filter members 10 in relation to header member 20. By way of example, the retention portions 58a, 58b may comprise U-shaped edge channels (e.g., having a semi-dovetail configuration). As may be appreciated, the retention portions 58a, 58b of strut members 58 further enhance the stability and durability of V-panel filter 1. To further enhance stability, bonding agents including adhesives (e.g., epoxies, hot melts, silicones) and solvents (e.g. acetone), and/or bonding steps (e.g. ultrasonic, thermal) may be utilized along interfacing regions of retention portions 58a, 58b.

Reference is now made to FIGS. 5A-5G which illustrate a V-panel filter apparatus 100 that comprises V-panel filter 1 and additional optional componentry, where the V-panel filter 1 is shown positioned for installation relative to an installation site 200 (e.g., an air intake site). The installation site 200 may comprise a frame 202 defining a grid having multiple apertures 204 (e.g., only one shown in FIG. 5A), each aperture 204 being sized for receipt of a V-panel filter 1. As may be appreciated, multiple other installation site configurations may be utilized with V-panel filter 1. In the embodiment shown in FIG. 5A, V-panel filter apparatus 100 comprises, in addition to V-panel filter 1, mounting clips 102 for interconnection of V-panel filter 1 to frame 202, a prefilter support frame 110 selectively and supportably connectable to and disconnectable from the V-panel filter 1, and a prefilter filter 120 selectively and supportably connectable to and disconnectable from the prefilter support frame 110. The prefilter filter 120 may be provided to filter particles larger than a first predetermined size, while the V-panel filter 1 may be provided to filter particles larger than a second predetermined size that is less than the first predetermined size. By way of example, prefilter filter 120 may have a filter rating of at least about G2, and preferably about F5 or greater (e.g., as determined in accordance with filter testing European Standard EN779:2005).

Figure 5A:
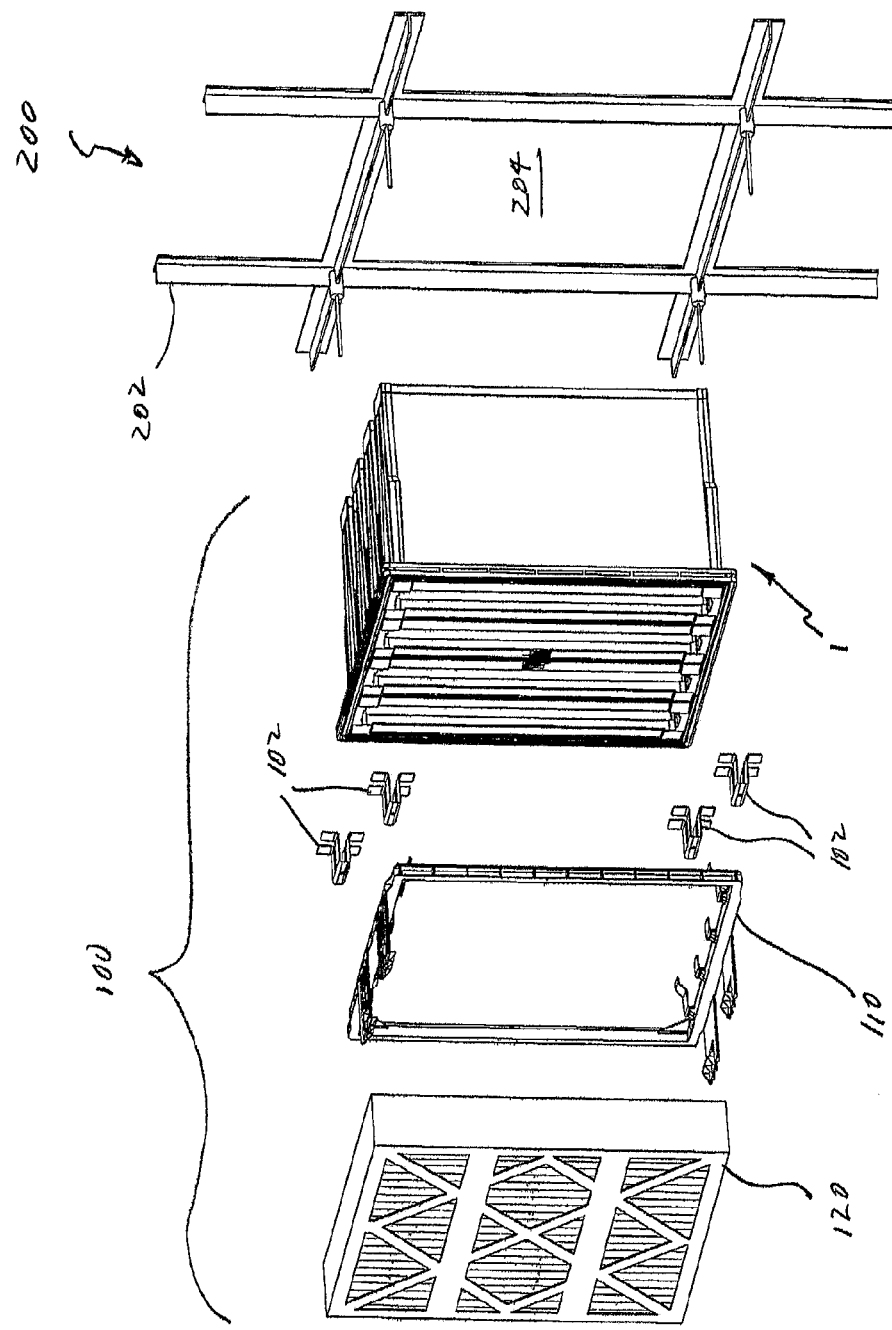
FIG. 5A is an exploded perspective view of a filter apparatus embodiment including the V-shaped filter embodiment of FIG. 1A and optional componentry employable therewith at an air intake port.
Figure 5B:
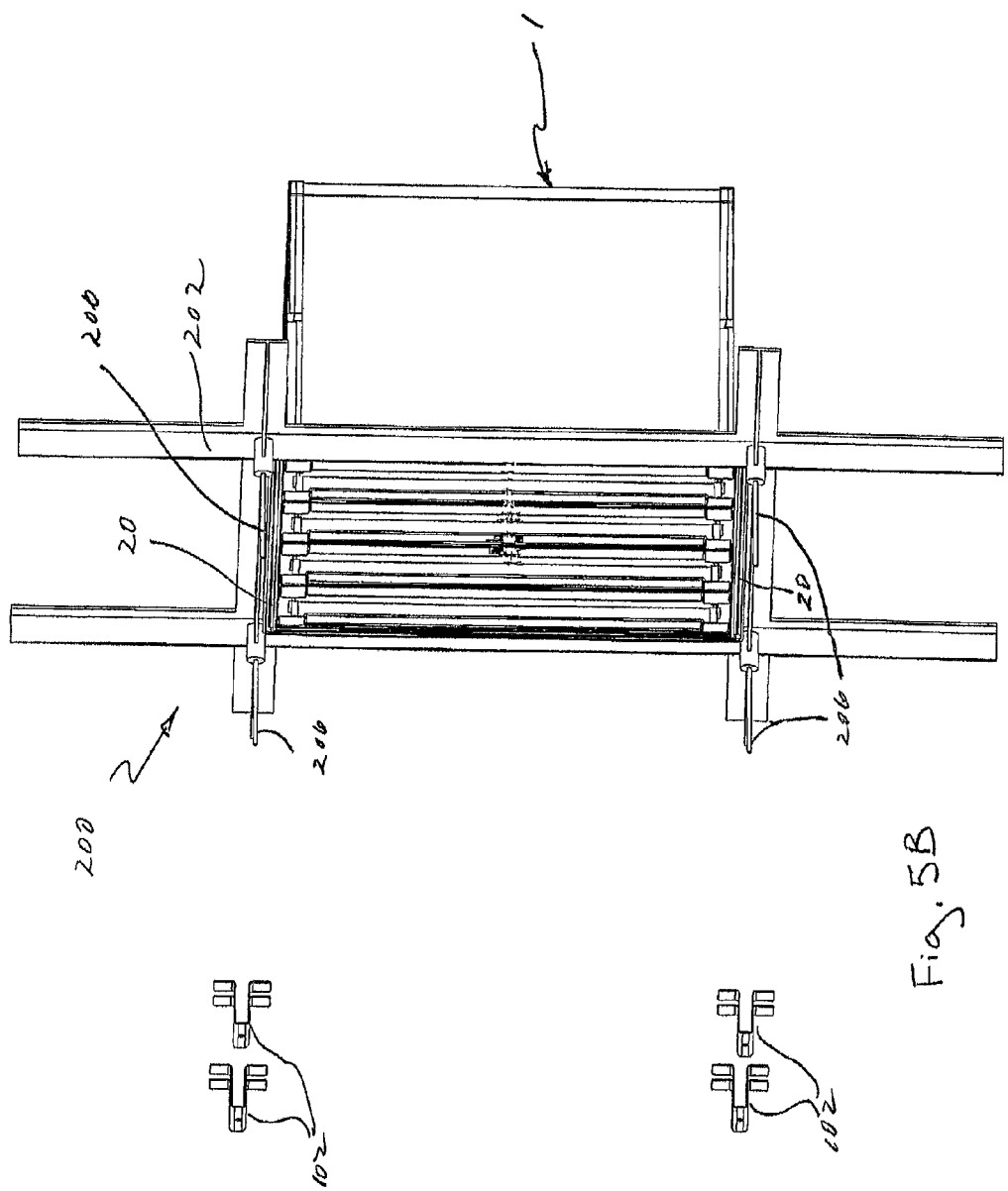

As shown in FIG. 5B, the V-panel filter 1 may be installed by advancing the V-panel filter 1 through an aperture 204 of frame 202 (e.g., so that the V-panel filter 1 projects on the "clean side" of a filter wall). The header member 20 of the V-panel filter 1 may be sized for face-to-face engagement with frame 202 about the periphery of aperture 204. Optionally, a gasket member (not shown) may be disposed between the header member 20 of V-panel filter 1 and the frame 202 surrounding aperture 204. After positioning of the V-panel filter 1 within aperture 204, mounting clips 102 may be advanced over support posts 206 interconnected to and projecting from the frame 202, as shown in FIG. 5C. The mounting clips 102 may be secured to the post member 206 via a threaded interface between a securement nut (not shown) and post member 206.

In another implementation, the V-panel apparatus 1 may be mounted to frame 202 in a reverse orientation to that shown in FIG. 5C (e.g., so that the V-panel filter apparatus 1 projects on the "dirty side" of a filter wall). In such arrangement, mounting clips 102 and post members 106 may be utilized to secure head member 20 on a peripheral frame portion on a reverse side to that shown in FIG. 5C.

Referring now to FIG. 5D, prefilter support frame 110 may be positioned for interconnection to the header member 20 of V-panel filter 1. Optionally, a gasket member (not shown) may be disposed between prefilter support frame 110 and header member 20. The prefilter support frame 110 may include a plurality of elastically-deformable projection members 112 located for spring-loaded engagement with complementary interface features of header member 20 of V-panel filter 1. By way of example, the projection members 112 may be located and sized for spring-loaded engagement with the projection members 26 of header member 20 and/or the complimentary surfaces 56 and 57 of the first and second plates 50a, 50b in FIG. 3A. In this regard, the projection members 112 may be located to project from a back side of the prefilter support frame 110 along a top and bottom portions 110a, 110b of the prefilter support frame 110, wherein the projection members extend into the openings 24 of the header member 20 at the top and bottom ends thereof, as shown in FIG. 5E. When so positioned, the prefilter support frame 110 is supportably interconnected to the header member 20 of the V-panel filter 1.

As shown in FIGS. 5D and 5E, the prefilter support frame 110 may further include a plurality of elastically-deformable projection members 114 projecting from a front side of the prefilter support frame 110 along the top and bottom portions 110a, 110b of the prefilter support frame 110. The projection members 114 may comprise ramp portions 114a at the ends thereof, and retention portions 114b located between the ramp portion 114a and the support frame 110.

In turn, the prefilter filter 120 may be positioned as shown in FIG. 5F, and advanced to be supportably interconnected to the prefilter support frame 110 as shown in FIG. 5G. More particularly, as the prefilter filter 120 is advanced, it may engage the ramp portions 114a of the projection members 114 so as to deflect the projection members 114 into snap-fit engagement with the prefilter filter 120, as shown in FIG. 5G. The retention portions 114b of the projection members 114 may be provided to have a sufficient length so as to advantageously space the prefilter filter 120 a predetermined distance (e.g., between about 0.5 inch and about 4 inches) from the header member 20 of the V-panel filter 1. Such spaced positioning optimizes filtration capacity of the filter apparatus 1.

It may also be advantageous to further protect the prefilter filter 120 from coarse particles and insects by placing a coarse filter in front of the prefilter filter 120. The coarse filter may have a filter rating of at least about G2 (e.g., as determined in accordance with filter testing European Standard EN779: 2005).

As may be appreciated, the described embodiments facilitate installation of and replacement of a V-panel filter 1 relative to an installation site 200 (e.g., a port or aperture comprising an air intake site). Such installation and replacement operations may be completed via handling of a single unit defined by the interconnected and sealed components of the improved V-panel filter 1. Further, the described embodiments provide for selective interconnection, support, and disconnection of a prefilter support frame to an installed V-panel filter, and interconnection support and disconnection of a prefilter filter to a prefilter support frame 110 interconnected to a V-panel filter 1 at an installation site.

Figure 6B:
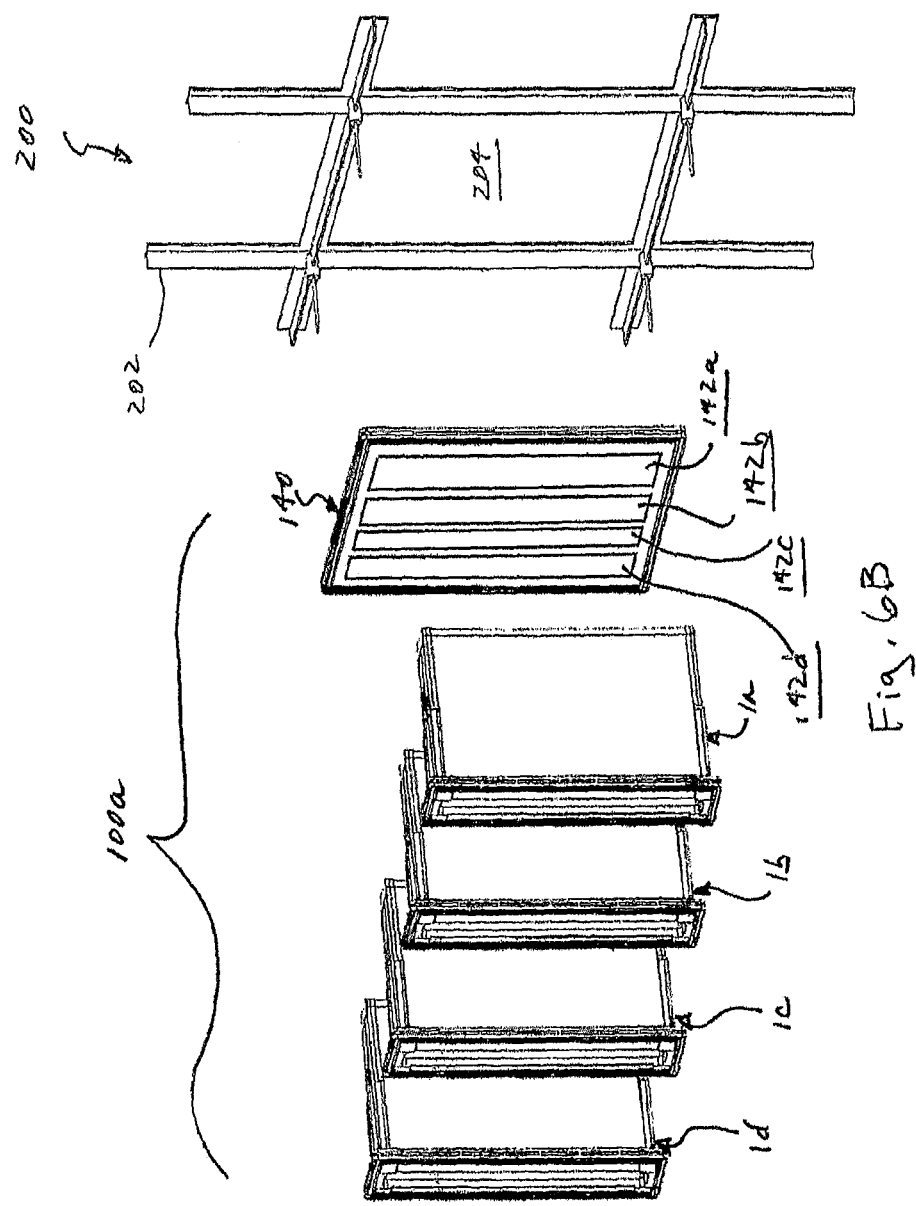
FIG. 6B is an exploded perspective view of another filter apparatus embodiment including the V-shaped filter embodiment of FIG. 6A and componentry employable therewith at an air intake port.

Numerous variant embodiments may comprise features described above. For example, reference is made to FIGS. 6A and 6B which illustrate a modular approach. In particular, FIG. 6A illustrates a V-panel filter 1a comprising a header member 20a having a single V-shaped filter member 10 supportably and sealably interconnected thereto. The V-panel filter 1a may comprise features and may be assembled as described hereinabove in relation to V-panel filter.

As shown in FIG. 6B, a plurality of identical V-panel filters 1a, 1b, 1c, and 1d may be assembled. In turn, a V-panel filter apparatus 100a comprising the V-panel filters 1a-1d and additional componentry may be positioned for installation relative to an installation site 200. Again, the installation site 200 may comprise a frame 202 defining a grid having multiple apertures 204 (e.g., only one shown in FIG. 5A), each aperture 204 being sized for receipt of the plurality of V-panel filters 1a-1d. In that regard, the V-panel filter apparatus 100a may further comprise an adapter 140 that may be selectively mounted to frame 202, e.g., utilizing mounting clips 102 as described above (not shown in FIG. 6A).

The adapter 140 may comprise a plurality of openings 142a, 142b, 142c, and 142d for receiving V-panel filters 1a, 1b, 1c, and 1d therethrough, respectively. The adapter 140 and/or the V-panel filters 1a, 1b, 1c, and 1d may be provided with interconnection members for selectively and separately interconnecting and disconnecting each of the V-panel filters 1a, 1b, 1c, and 1d relative to mounted adapter 140. By way of example, projection members analogous to those described above (not shown in FIG. 6B) may extend from the backside of adapter 140 at opposite ends of each of the openings 142a, 142b, 142c, and 142d. Further, complimentary surface portions, analogous to the described above, may be provided on the first side plate 50a and/or second side plate 50b of each of the V-panel filters 1a, 1b, 1c, and 1d to facilitate selective interconnection and disconnection of the V-panel filters 1a, 1b, 1c, and 1d relative to adapter 140. As may be appreciated, the approach illustrated in FIGS. 6A and 6B accommodates separate installation and replacement of the V-panel filters 1a, 1b, 1c, and 1d.

Figure 7:
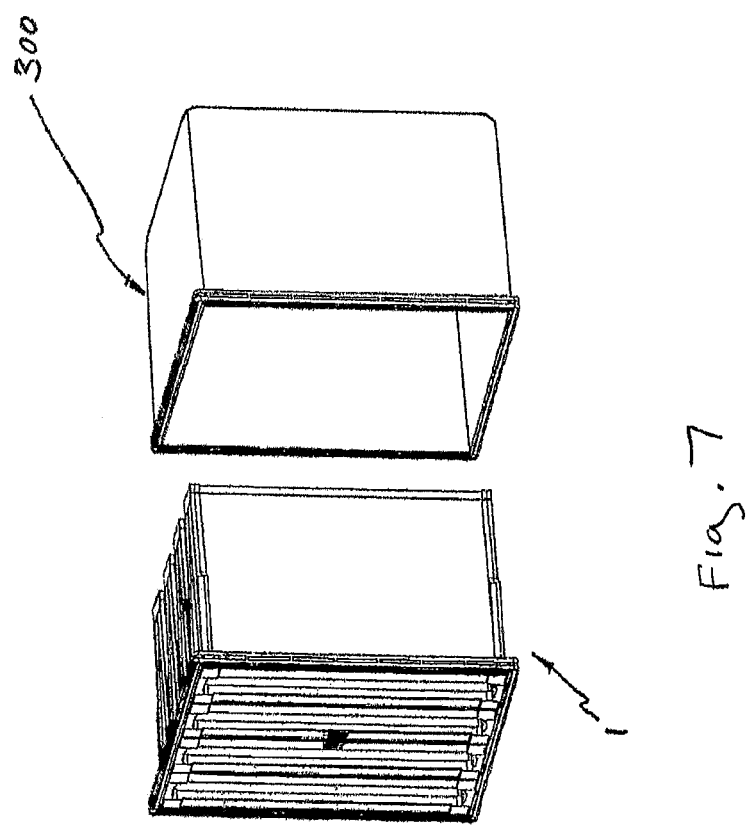
FIG. 7 is an exploded perspective view of the V-shaped embodiment of FIG. 1A, together with an embodiment of a safety filter employable therewith.

In another variant embodiment, a safety filter may be utilized with the above-described embodiments to facilitate replacement of V-panel filter 1 or modular V-panel filters 1a, 1b, 1c, and 1d during operation of equipment associated with an air intake site (e.g., operation of a gas combustion turbine). By way of example, reference is made to FIG. 7 showing V-panel filter 1 described above and a safety filter 300 sized to receive the V-panel filter 1 therein. As may be appreciated, the safety filter 300 is provided for installation downstream of the V-panel filter 1. The safety filter 300 may be utilized to filter dirt, debris, and other materials during replacement of V-panel filter 1.

The safety filter 300 may comprise material that may be wet-laid, dry-laid, spunlace, spunbond, and/or melt blown. In one approach, the safety filter 300 may comprise a dry-laid polyester, polyolefine, or fiberglass material. The filtration efficiency may have a rating of G2 or higher, a rating of at least G4, or a rating of F5 or more (e.g., as determined in accordance with filter testing European Standard EN779: 2005). In one approach, the safety filter 300 may further include a cage (e.g., constructed of metal wire) or a netting mesh (e.g., comprising a polymer material) to support the media of the safety filter 300.

FIG. 8 illustrates the implementation of a safety filter 300 with a V-panel filter apparatus 100 shown and described in relation to FIGS. 5A-5G above. FIG. 9 illustrates an implementation of safety filter 300 with the V-panel filter apparatus 100a shown and described above in relation to FIG. 6B.

Test Method

Water-Tightness

The filter is placed horizontally with the end caps 40 sitting on a flat surface. Deionized water is poured into the recess opening of the header member 20 until the water level is 4 inch from the top surface of the potting material in the recess portion of the end caps 40. The outside of the filter is observed for any water that escapes out through the interfaces between the filter panels, end caps and side plates. The filter passes if no water leaks within 24 hours.

EXAMPLE 1

A V-panel filter with the filter production method described herein was produced as follows: Utilizing fused deposition modeling (FDM) in rapid prototyping techniques, prototypes of V-panel filter component members were made with ABS plastics: end caps with overall dimensions of 21.59 inch×2.69 inch×0.635 inch, side plates with overall dimensions of 15.55 inch×5.27 inch×0.70 inch, and header with overall dimensions 23.38 inch×23.38 inch×1.90 inch. Eight filter panels were produced by pleating a filter media (Part #4700, available from W.L. Gore & Associates, Inc., Newark, Del.) comprising a microporous expanded polytetrafluoroethylene membrane. The filter panel overall size was 21.22 inch×15 inch×1.14 inch.

A two-part curable potting material was formulated from polyol and isocyanate (Part #P8 available from W.L. Gore & Associates, Inc., Newark, Del.). An end cap was placed horizontally on a flat surface with the recess portion facing up. The polyol and isocyanate were mixed together and dispensed onto the recess portion of the end cap. The first side end edge of first filter panel was introduced into the potting material at an angle forming the first side of the V. Then, the first side end edge of second filter panel was introduced into the potting material at an angle forming the second side of the V. The first side edges of the first and second panels were completely immersed in the potting materials to form an air-tight and water-tight seal. The first sub-assembly was allowed to cure in room temperature until the potting material was hardened.

A first side plate was placed horizontally on a flat surface with the recess portion facing up. The polyol and isocyanate were mixed together and dispensed onto the recess portion of the first side plate. The first side edge of the first sub-assembly was introduced vertically into the potting material to form the second sub-assembly. The first side edge was completely immersed in the potting materials to form an air-tight and water-tight seal. The second sub-assembly was allowed to cure in room temperature until the potting material was hardened.

A second side plate was placed horizontally on a flat surface with the recess portion facing up. The polyol and isocyanate were mixed together and dispensed onto the recess portion of the second side plate. The second side edge of the second sub-assembly was introduced vertically into the potting material to form the third sub-assembly. The second side edge was completely immersed in the potting materials to form an air-tight and water-tight seal. The third sub-assembly was allowed to cure in room temperature until the potting material was hardened.

The aforementioned steps were repeated to produce four subassemblies identical to the third sub-assembly. Then, a header member was placed horizontally on a flat surface with the recess portion facing up. The polyol and isocyanate were mixed together and dispensed onto the recess portion of the header member. The side edge of the filter panel of the third sub-assembly was introduced vertically into the potting material to form part of the V-panel assembly. The filter panel side edge was completely immersed in the potting materials to form an air-tight and water-tight seal. This procedure was repeated four times to produce a complete V-panel assembly with four Vs. The complete assembly was allowed to cure in room temperature until the potting material was hardened.

The V-panel filter was tested according to the European Standard EN 1822:2009. Furthermore, the V-panel filter was tested for water-tightness according to the test method described previously. As shown in Table 1, the V-panel filter produced according to the here thereto procedures achieved a filter rating of E12 and passed the water-tightness criteria.

TABLE 1

Test results of example V-panel filter

| Test | Example |
|---|---|
| Test Airflow Rate | 2,000 cubic feet per minute |
| Pressure Loss | 0.65 inch of water |
| Filtration Efficiency at 0.1 μm | 99.57% |
| Water-tightness | No water leak in 24 hours |

The foregoing description of the present invention has been presented for purposes of illustration and description. The description is not intended to limit the invention to the form disclosed herein. Consequently, variations and modifications commensurate with the above teachings, and skill and knowledge of the relevant art, are within the scope of the present invention. The embodiments described hereinabove are further intended to explain known modes of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art.

What is claimed is:

1. A method of assembly of a V-panel filter apparatus, said method comprising:
    forming a first V-panel filter member, including:
        flowing a curable potting material into at least one recess portion of an end cap, wherein said potting material is contained by said at least one recess portion of said end cap;
        positioning a first end edge surface of each of a first filter panel and second filter panel into said potting material contained by said at least one recess portion of said end cap;
        curing said potting material contained by said at least one recess portion of said end cap to seal said first end edge surfaces of said first and second filter panels within said potting material contained by said at least one recess portion of said end cap, wherein said first and second filter panels are positioned to diverge away from said end cap to define a V-shaped configuration;
        flowing a curable potting material into at least one recess portion of a header member, wherein said potting material is contained by said at least one recess portion of said header member;
        positioning a second end edge surface of each of said first filter panel and second filter panel into said potting material contained by said at least one recess portion of said header member;
        curing said potting material contained by said at least one recess portion of said header member to seal said second end edge surfaces of said first and second filter panels within said at least one recess portion of said header member;

forming a second V-panel filter member, the second V-panel filter member including third and fourth filter panels each having a first and a second end edge surface, an end cap in which the first end edge surfaces of the third and fourth filter panels are sealed, and a header member in which the second end edges of the third and fourth filter panels are sealed, such that the first and second V-panel filter members are receivable in an adapter for selective interconnection and disconnection of the first and second V-panel filter members.

2. The method of assembly of a V-panel filter apparatus, said method comprising:
   a first step of:
      flowing a curable potting material into at least one recess portion of an end cap, wherein said potting material is contained by said at least one recess portion of said end cap;
      positioning a first end edge surface of each of a first filter panel and second filter panel into said potting material contained by said at least one recess portion of said end cap; and
      curing said potting material contained by said at least one recess portion of said end cap to seal said first end edge surfaces of said first and second filter panels within said potting material contained by said at least one recess portion of said end cap, wherein said first and second filter panels are positioned to diverge away from said end cap to define a V-shaped configuration;
   a second step of:
      flowing a curable potting material into at least one recess portion of a first side plate, wherein said potting material is contained by said at least one recess portion of said first side plate;
      positioning a first side edge surface of each of said first and second filter panels into said potting material contained by said at least one recess portion of said first side plate, said positioning comprising locating a first end portion of said end cap within said at least one recess portion of said first side plate; and
      curing said potting material contained by said at least one recess potion of said first side plate to seal said first side edge surfaces of each of said first and second filter panels within said potting material contained by said at least one recess portion of said first side plate; and
   a third step of:
      flowing a curable potting material into at least one recess portion of a second side plate, wherein said potting material is contained by said at least one recess portion of said second side plate;
      positioning a second side edge surface of each of said first and second filter panels into said potting material contained by said at least one recess portion of said second side plate, said positioning comprising locating a second end portion of said end cap within said at least one recess portion of said second side plate;
      curing said potting material contained by said at least one recess portion of said second side plate to seal said second side edge surfaces of each of said first and second filter panels within said potting material contained by said at least one recess portion of said second side plate; and
   a fourth step of:
      flowing a curable potting material into at least one recess portion of a header member, wherein said potting material is contained by said at least one recess portion of said header member;
      positioning a second end edge surface of each of said first filter panel and second filter panel into said potting material contained by said at least one recess portion of said header member; and
      curing said potting material contained by said at least one recess portion of said header member to seal said second end edge surfaces of said first and second filter panels within said potting material contained by said at least one recess portion of said header member,
   wherein said third step and said fourth step occur after said first step,
   wherein said first, second, and third steps are completed a plurality of times to define a corresponding plurality of V shaped filter members, and wherein for each said one of the plurality of V shaped filter members the steps of said fourth step are completed after the steps of said first, second, and third steps so that each said one of the plurality of V shaped filter members is positionable as a single unit in said positioning step of said fourth step,
   wherein adjacent ones of the plurality of V shaped filter members are engaged along at least a portion of their corresponding first side plates and corresponding second side plates,
   wherein said corresponding portions of said first side plates and said second side plates comprise U shaped edge channels adapted for sliding, interlocking engagement.

3. The method of claim 2, wherein a water tight interface is established between said edge surfaces of said first and second filter panels and corresponding ones of said end cap, said header member, said first side plate and said second side plate.

4. The method of claim 2, wherein said flowing said curable potting material into said at least one recess portion of said header member comprises:
   interconnecting said first and second side plates to said header member via snap-fit engagement.

5. The method of claim 2, wherein prior to said fourth step, said first, second, and third steps are completed to define a V-shaped filter member, and wherein said V-shaped filter member is positionable as a single unit in said positioning step in said fourth step.

6. The method of claim 2, wherein said potting material has a viscosity of at least 150 centipoise.

7. A method for use of the V-panel filter apparatus assembled according to the method of claim 2, comprising:
   supportably mounting said header member of said V-panel filter apparatus at an air intake site.

8. The method of claim 7, further comprising:
   supportably connecting a prefilter support frame to said mounted header member, wherein said prefilter support frame is adapted to supportably retain a prefilter filter, and wherein the prefilter support frame is selectively disconnectable from said header member.

9. The method of claim 8, said supportably connecting step further comprising interconnecting said prefilter support frame to said mounted header member via snap-fit engagement.

10. The method of claim 8, further comprising:
   positioning a prefilter filter in supported relation to said prefilter support frame connected to said mounted header member, wherein said prefilter filter is selectively removable from said prefilter support frame.

11. The method of claim, 10, wherein said positioning locates said prefilter filter in a spaced relation to said header member.

12. The method of claim 10, wherein said positioning further comprises:
interconnecting said prefilter filter to said prefilter support frame via snap-fit engagement.

13. The method of claim 7, further comprising:
supportably mounting a safety filter at said air intake site, wherein said V-panel filter apparatus is removable from said air intake site without removal of said mounting safety filter.

14. A V-panel filter apparatus, comprising:
at least a first V-shaped filter member, including:
first and second filter panels each having a first end edge surface sealably disposed within potting material contained by at least one recess portion of an end cap, wherein the first and second filter panels diverge away from said end cap to define a V-shaped configuration;
a first side plate, wherein a first side edge surface of each of said first and second filter panels is sealably disposed within potting material contained by at least one recess portion of said first side plate;
a second side plate, wherein a second side edge surface of each of said first and second filter panels is sealably disposed within potting material contained by at least one recess portion of said second side plate;
a header member, wherein for said at least a first V-shaped filter member, a second end edge surface of each of said first and second filter panels is sealably disposed within potting material contained by at least one recess portion of said header member; and
a safety filter sized to receive said at least a first V-shaped filter member within an enclosed region thereof.

15. The V-panel filter apparatus of claim 14, wherein said header member and said first and second side plates are adapted for snap-fit engagement between said header member and each of said first and second side plates.

16. The V-panel filter apparatus of claim 14, wherein said header member comprises first and second projection members elastically deformable for snap-fit engagement with complimentary surface portions comprising the first and second side plates, respectively.

17. The V-panel filter apparatus of claim 14, wherein said header member comprises a channel-shaped recess portion on each side of at least a first opening, for containing said potting material and receiving said second end edge surfaces of said first and second filter panels.

18. The V-panel filter apparatus of claim 17, wherein end portions of said first side plate and said second side plate are positioned within corresponding ones of said channel-shaped recess portions of said header member.

19. The V-panel filter apparatus of claim 14, wherein said at least one recess portion of each of said first and second side plates is of a V-shaped configuration for containing said potting material and receiving said first and second side edge surfaces of said first and second filter panels therein, respectively.

20. The V-panel filter apparatus of claim 14, wherein first and second end portions of said end cap are seated within corresponding regions of said at least one recess portion of said first and second side plates, respectively.

21. The V-panel filter apparatus of claim 14, wherein a water tight interface is established between each of said edge surfaces of said first and second filter panels and corresponding ones of said end cap, said header member, said first side plate and said second side plate, by pot-and-place assembly.

22. The V-panel assembly of claim 14, wherein said at least a first V-shaped filter member is assembled as a single unit prior to assembly with said header member.

23. The V-panel filter apparatus of claim 14, wherein said first and second filter panels comprise pleated, microporous membranes comprising at least one of the following materials:
expanded polytetrafluoroethylene;
polypropylene; and
polyethylene.

24. A V-panel filter assembly, comprising a plurality of V-shaped filter members positioned adjacent to one another and each separately including:
first and second filter panels each having a first end edge surface sealably disposed within potting material contained by at least one recess portion of an end cap, wherein the first and second filter panels diverge away from said end cap to define a V-shaped configuration;
a first side plate, wherein a first side edge surface of each of said first and second filter panels is sealably disposed within potting material contained by at least one recess portion of said first side plate; and,
a second side plate, wherein a second side edge surface of each of said first and second filter panels is sealably disposed within potting material contained by at least one recess portion of said second side plate, wherein a second end edge surface of each of said first and second filter panels is sealably disposed within potting material contained by at least one recess portion of a header member;
wherein for each of said plurality of V-shaped filter members a corresponding second end edge surface of each of said corresponding first and second filter panels is disposed within said potting material contained by at least one corresponding recess portion of said header member and further wherein the first side plates of the adjacent V-shaped filter members are engaged with one another.

25. The V-panel filter apparatus of claim 24, wherein said header member and said first and second side plates of each of said plurality of V-shaped filter members are adapted for snap-fit engagement.

26. The V-panel filter apparatus of claim 24, wherein each of said plurality of V-shaped filter members is assembled as a single unit prior to assembly with said header member.

27. The V-panel filter apparatus of claim 24, wherein adjacent ones of the plurality of V-shaped filter members are engaged along at least a portion of the corresponding first side plates and corresponding second side plates.

28. The V-panel filter apparatus of claim 27, wherein said corresponding portions of said first side plates and second side plates comprise U-shaped edge channels adapted for sliding, interlocking engagement.

29. The V-panel filter apparatus of claim 24, further comprising:
a prefilter support frame supportably connectable to and disconnectable from said header member, wherein said prefilter support frame is adapted to support a prefilter filter.

30. The V-panel filter apparatus of claim 29, wherein said prefilter support frame comprises a plurality of projection members elastically deformable for supportable engagement with said header member.

31. The V-panel filter apparatus of claim 29, wherein said prefilter support frame is provided to support a prefilter filter in spaced relation to said header member.

32. The V-panel filter apparatus of claim 29, wherein said prefilter support frame comprises a plurality of projection members elastically deformable for selective interconnection and disconnection of a prefilter filter in relation thereto.

33. A V-panel filter apparatus comprising a plurality of V-shaped filter members each separately including:
- first and second filter panels each having a first end edge surface sealably disposed within potting material contained by at least one recess portion of an end cap, wherein the first and second filter panels diverge away from said end cap to define a V-shaped configuration;
- a first side plate, wherein a first side edge surface of each of said first and second filter panels is sealably disposed within potting material contained by at least one recess portion of said first side plate;
- a second side plate, wherein a second side edge surface of each of said first and second filter panels is sealably disposed within potting material contained by at least one recess portion of said second side plate; and,
- a header member, wherein a second end edge surface of each of said first and second filter panels is sealably disposed within potting material contained by at least one recess portion of said header member;
- wherein said V-panel filter apparatus further comprises an adapter for separate interconnection to and disconnection from each of said plurality of V-shaped filter members.

34. A method of assembly of a V-panel filter apparatus including a plurality of V-panel filters each including a pair of filter panels, each filter panel having first and second side edges and first and second end edges, the method comprising:
- forming a first V-panel filter member:
  - securing the first end edges of a first pair of filter panels to an endcap with potting material such that the first pair of filter panels diverge away from the endcap to define a V-shaped configuration;
  - securing the first side edges of the first pair if filter panels to a first side plate With potting material;
  - securing the second side edges of the first pair of filter panels to a second side plate with potting material; and
- forming a second V-panel filter member, including:
  - securing the first end edges of a second pair of filter panels to an endcap with potting material such that the second pair of filter panels diverge away from the endcap to define a V-shaped configuration;
  - securing the first side edges of the second pair of filter panels to a first side plate with potting material;
  - securing the second side edges of the second pair of filter panels to a second side plate with potting material; and
- arranging the first V-panel filter member adjacent to the second V-panel filter member such that the second side plate of the first V-panel filter engages the first side plate of the second V-panel filter; and
- securing the first V-panel filter adjacent to the second V-panel filter.

35. The method of claim 34, wherein the first and second slide plates of each of the first and second V-panel filters comprise edge channels, the method further comprising arranging the first and second V-panels filters such an edge channel of the first V-panel filter engages an edge channel of the second V-panel filter.

36. The method of claim 34, further comprising engaging the edge channels of the first and second V-panel filters such that the edge channels are slidably interlocked.

* * * * *